US012185375B2

(12) United States Patent
Huang et al.

(10) Patent No.: US 12,185,375 B2
(45) Date of Patent: Dec. 31, 2024

(54) METHOD AND APPARATUS FOR RANDOM ACCESS CHANNEL (RACH)-BASED SMALL DATA TRANSMISSION PROCEDURE IN A WIRELESS COMMUNICATION SYSTEM

(71) Applicant: ASUSTek Computer Inc., Taipei (TW)

(72) Inventors: Yi-Hsuan Huang, Taipei (TW); Meng-Hui Ou, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 17/150,378

(22) Filed: Jan. 15, 2021

(65) Prior Publication Data
US 2021/0227586 A1    Jul. 22, 2021

Related U.S. Application Data

(60) Provisional application No. 62/962,266, filed on Jan. 17, 2020.

(51) Int. Cl.
H04W 52/00     (2009.01)
H04W 52/24     (2009.01)
H04W 74/0833   (2024.01)
H04W 76/27     (2018.01)

(52) U.S. Cl.
CPC ..... *H04W 74/0833* (2013.01); *H04W 52/241* (2013.01); *H04W 52/242* (2013.01); *H04W 76/27* (2018.02)

(58) Field of Classification Search
CPC ........... H04W 74/0833; H04W 52/241; H04W 52/242; H04W 76/27; H04W 52/362; H04W 72/1268; H04W 74/004; H04B 17/327; H04B 17/318
See application file for complete search history.

(56) References Cited

U.S. PATENT DOCUMENTS

2011/0300858 A1* 12/2011 Lee .................. H04W 8/24
                                              455/425
2015/0282213 A1* 10/2015 Sun ............... H04W 74/0833
                                              370/329
2016/0007388 A1*  1/2016 Ianev ................ H04W 4/70
                                              455/450

(Continued)

FOREIGN PATENT DOCUMENTS

CN    109699088 A    4/2019
CN    110192415 A    8/2019

(Continued)

OTHER PUBLICATIONS

Office Action to the corresponding Korean Patent Application rendered by the Korean Intellectual Property Office (KIPO) on Dec. 19, 2022, 11 pages (including English translation).

(Continued)

*Primary Examiner* — Lakeram Jangbahadur
(74) *Attorney, Agent, or Firm* — Skaar Ulbrich Macari, P.A.

(57) ABSTRACT

A method and device are disclosed from the perspective of a first User Equipment (UE). In one embodiment, the UE receives a configuration of a threshold. Furthermore, the UE determines whether to initiate a procedure of small data transmission based on at least the threshold. In addition, the UE does not initiate the procedure of small data transmission if a radio condition of the UE is below the threshold.

16 Claims, 14 Drawing Sheets

(56) References Cited

U.S. PATENT DOCUMENTS

| | | | |
|---|---|---|---|
| 2017/0251516 A1* | 8/2017 | Bangolae | H04W 76/22 |
| 2018/0110074 A1* | 4/2018 | Akkarakaran | H04W 72/21 |
| 2018/0270869 A1 | 9/2018 | Tsai | |
| 2018/0302914 A1* | 10/2018 | da Silva | H04W 76/27 |
| 2019/0289661 A1 | 9/2019 | Chen | |
| 2020/0037345 A1* | 1/2020 | Ryoo | H04W 74/0833 |
| 2020/0077422 A1 | 3/2020 | He et al. | |
| 2020/0100297 A1* | 3/2020 | Agiwal | H04W 24/08 |
| 2022/0095331 A1* | 3/2022 | Laselva | H04W 76/27 |

FOREIGN PATENT DOCUMENTS

| | | | | |
|---|---|---|---|---|
| CN | 110268742 A | | 9/2019 | |
| CN | 110291810 A | | 9/2019 | |
| KR | 10-2018-0035719 | | 4/2018 | |
| KR | 20190065297 A | * | 6/2019 | |
| WO | 2020148483 | | 7/2020 | |
| WO | WO-2020148483 A1 | * | 7/2020 | H04L 1/18 |

OTHER PUBLICATIONS

ZTE et al., R2-1701932, Quantitative analysis on UL data transmission in inactive state, 3GPP TSG RAN WG2 #97, Date of Publication on 3GPP server (Feb. 4, 2017), 15 pages.

3rd Generation Partnership Project; Technical Specification Group Services and System Aspects; Feasibility Study on New Services and Markets Technology Enablers; Stage 1 (Release 14); 3GPP TR 22.891 V14.2.0; Sep. 2016; 95 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15); 3GPP TS 36.300 V15.8.0; Dec. 2019; 365 pages.

3rd Generation Partnership Project; Technical Specification Group Radio Access Network; NR; Radio Resource Control (RRC) protocol specification (Release 15); 3GPP TS 38.331; Dec. 2019; 532 pages.

ZTE Corporation, Sanechips; 3GPP TSG-RAN WG2 Meeting #108; R2-1914798; Change Request version 15.6.0; Nov. 18-22, 2019; 36 pages.

Nokia (rapporteur), Nokia Shanghai Bell; 3GPP TSG-RAN WG2 Meeting #108; R2-1915889; Change Request version 15.7.0; Nov. 18-22, 2019; 9 pages.

ZTE Corporation; Work Item on NR smalldata transmissions in INACTIVE state; 3GPP TSG RAN Meeting #86; RP-193252; Dec. 9-12, 2019; 4 pages.

NR; Medium Access Control (MAC) protocol specification; 3GPP TS 38.321 V15.8.0; Dec. 2019; 78 pages.

E-UTRA; Medium Access Control (MAC) protocol specification; 3GPP TS 36.321 V15.8.0; Dec. 2019; 134 pages.

E-UTRA, Radio Resource Control (RRC) protocol specification; 3GPP TS 36.331 V15.8.0; Dec. 2019; 964 pages.

Ericsson; New SID on support of reduced capability NR devices; RP-193238; Dec. 9-12, 2019; 5 pages.

* cited by examiner

METHOD AND APPARATUS FOR RANDOM ACCESS CHANNEL (RACH)-BASED SMALL DATA TRANSMISSION PROCEDURE IN A WIRELESS COMMUNICATION SYSTEM

CROSS-REFERENCE TO RELATED APPLICATIONS

The present Application claims the benefit of U.S. Provisional Patent Application Ser. No. 62/962,266 filed on Jan. 17, 2020, the entire disclosure of which is incorporated herein in their entirety by reference.

FIELD

This disclosure generally relates to wireless communication networks, and more particularly, to a method and apparatus for Random Access Channel (RACH)-based small data transmission procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and device are disclosed from the perspective of a first User Equipment (UE). In one embodiment, the UE receives a configuration of a threshold. Furthermore, the UE determines whether to initiate a procedure of small data transmission based on at least the threshold. In addition, the UE does not initiate the procedure of small data transmission if a radio condition of the UE is below the threshold.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, 3GPP NR (New Radio), or some other modulation techniques.

In particular, the exemplary wireless communication systems devices described below may be designed to support one or more standards such as the standard offered by a consortium named "3rd Generation Partnership Project" referred to herein as 3GPP, including: TS 38.321 V15.8.0, "NR, Medium Access Control (MAC) protocol specification"; R2-1914798, "Running MAC CR for 2-step RACH", ZTE Corporation, Sanechips; R2-1915889, "Stage-2 running CR for 2-step RACH", Nokia, Nokia Shanghai Bell; 3GPP TS 38.331 V15.8.0, "NR, Radio Resource Control (RRC) protocol specification"; TS 36.300 V15.8.0, "E-UTRA and E-UTRAN; Overall description; Stage 2"; TS 36.321 V15.8.0, "E-UTRA; Medium Access Control (MAC) protocol specification"; TS 36.331 V15.8.0, "E-UTRA, Radio Resource Control (RRC) protocol specification"; RP-193252, "Work Item on NR small data transmissions in INACTIVE state", ZTE Corporation; and RP-193238, "New SID on support of reduced capability NR devices", Ericsson. The standards and documents listed above are hereby expressly incorporated by reference in their entirety.

Figure 1:
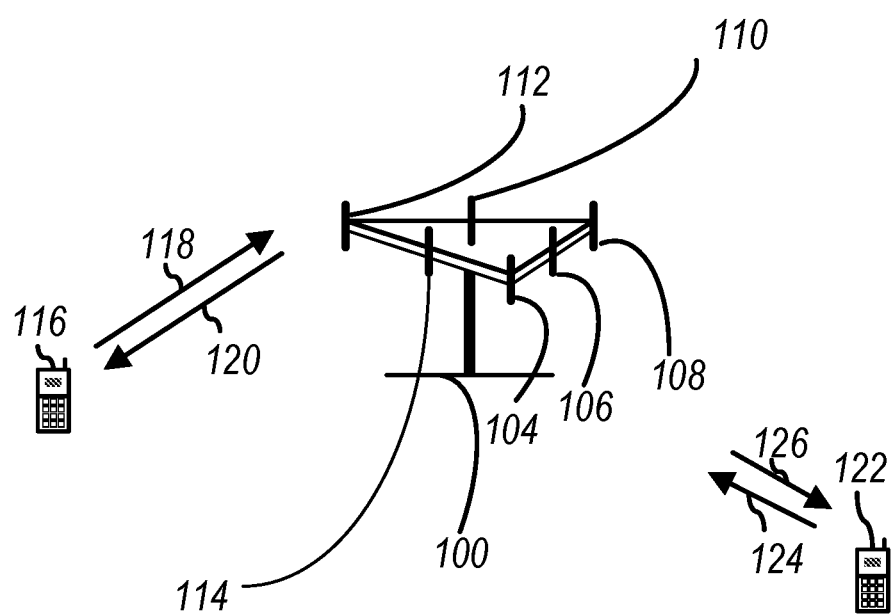
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), a network node, a network, or some other terminology. An access terminal (AT) may also be called user equipment (UE), a wireless communication device, terminal, access terminal or some other terminology.

Figure 2:
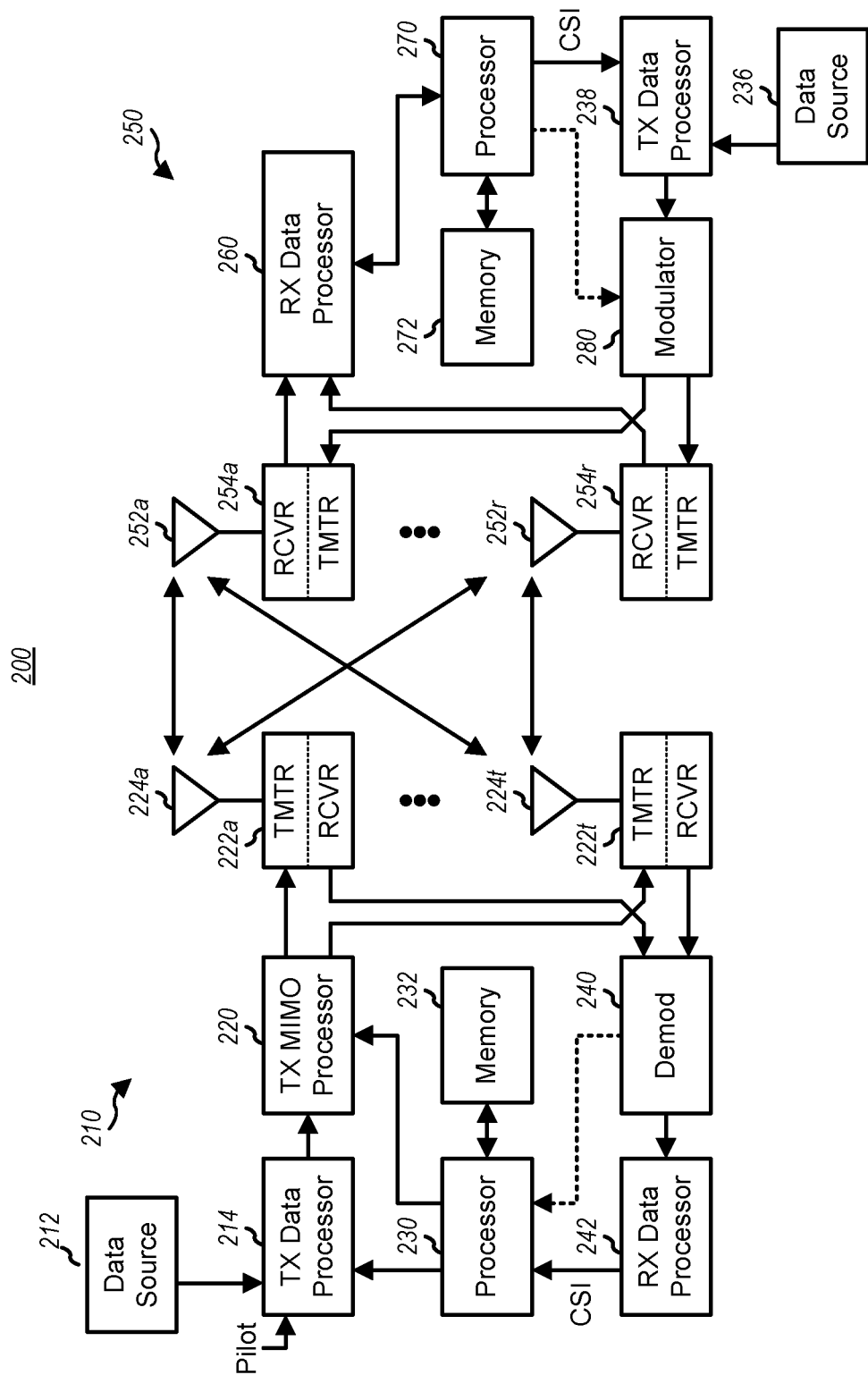
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
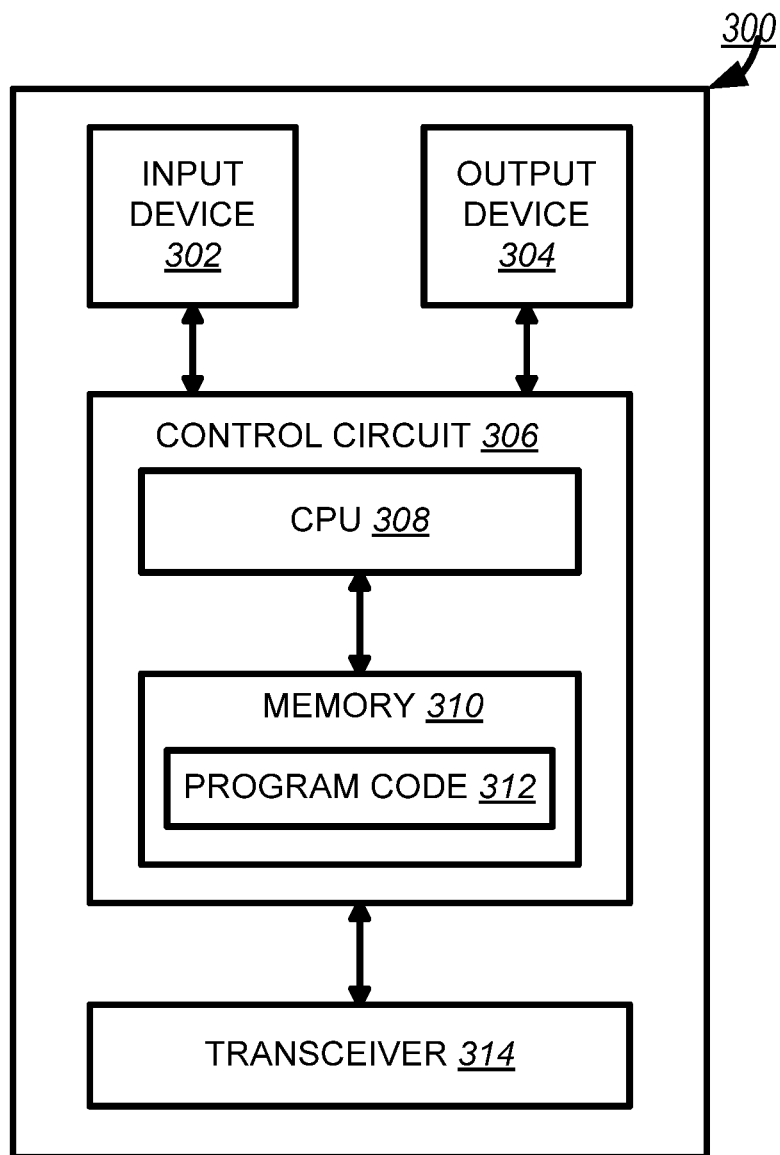
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the $N_R$ system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
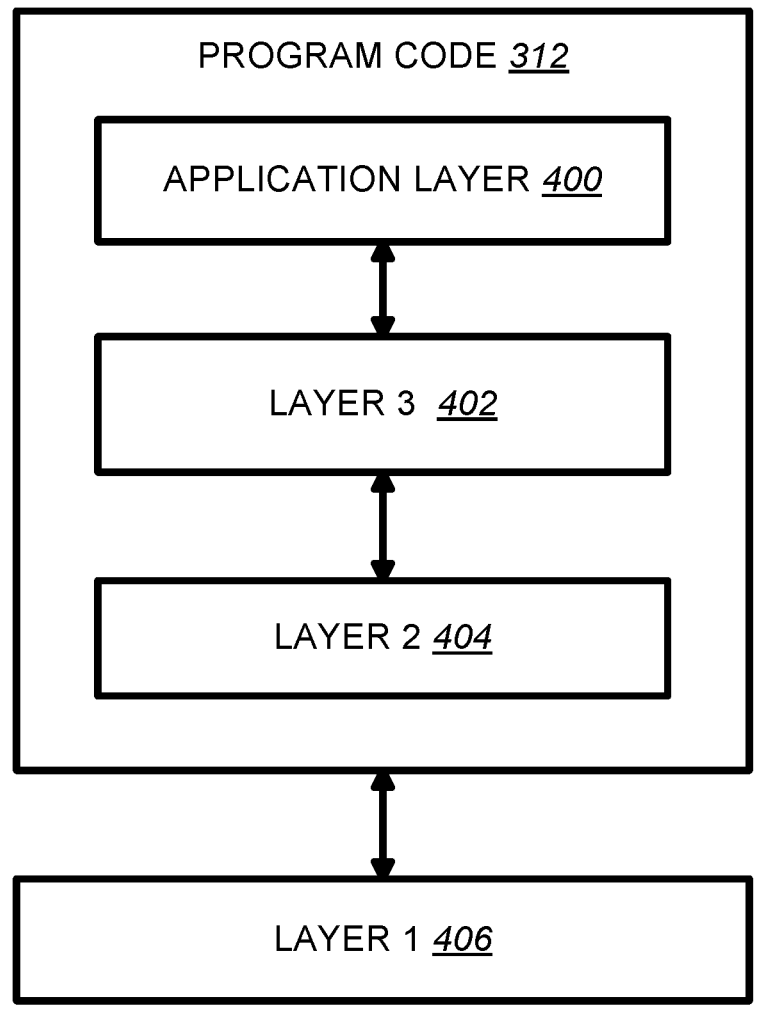
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In $N_R$, the initialization procedure of 4-step as well as 2-step Random Access (RA) and the RA resources selection are specified in 3GPP TS 38.321 with the running CR R2-1914798 (as captured in 3GPP R2-1914798) as follows:

5.1 Random Access Procedure
5.1.1 Random Access Procedure Initialization

The Random Access procedure described in this clause is initiated by a PDCCH order, by the MAC entity itself, or by RRC for the events in accordance with TS 38.300 [2]. There is only one Random Access procedure ongoing at any point in time in a MAC entity. The Random Access procedure on an SCell shall only be initiated by a PDCCH order with ra-PreambleIndex different from 0b000000.

NOTE 1: If a new Random Access procedure is triggered while another is already ongoing in the MAC entity, it is up to UE implementation whether to continue with the ongoing procedure or start with the new procedure (e.g. for SI request).

RRC configures the following parameters for the Random Access procedure:

Editor's Note: The RRC parameters for 2-step random access will be added here (RAN1 input needed for power control related parameters etc.). The names of the IEs listed below are also FFS and can be revisited later.

prach-ConfigurationIndex: the available set of PRACH occasions for the transmission of the Random Access Preamble;

preambleReceivedTargetPower: initial Random Access Preamble power;

rsrp-ThresholdSSB: an RSRP threshold for the selection of the SSB. If the Random Access procedure is initiated for beam failure recovery, rsrp-ThresholdSSB used for the selection of the SSB within candidateBeamRSList refers to rsrp-ThresholdSSB in BeamFailureRecoveryConfig IE;

rsrp-ThresholdCSI-RS: an RSRP threshold for the selection of CSI-RS. If the Random Access procedure is initiated for beam failure recovery, rsrp-ThresholdCSI-RS is equal to rsrp-ThresholdSSB in BeamFailureRecoveryConfig IE;

rsrp-ThresholdSSB-SUL: an RSRP threshold for the selection between the NUL carrier and the SUL carrier;

rsrp-ThresholdSSB-2stepCBRA: an RSRP threshold for selection of 2-step random access candidateBeamRSList: a list of reference signals (CSI-RS and/or SSB) identifying the candidate beams for recovery and the associated Random Access parameters;

recoverySearchSpaceId: the search space identity for monitoring the response of the beam failure recovery request;

powerRampingStep: the power-ramping factor;

powerRampingStepHighPriority: the power-ramping factor in case of prioritized Random Access procedure;

scalingFactorBI: a scaling factor for prioritized Random Access procedure;

ra-PreambleIndex: Random Access Preamble;

ra-ssb-OccasionMaskIndex: defines PRACH occasion(s) associated with an SSB in which the MAC entity may transmit a Random Access Preamble (see clause 7.4);

ra-OccasionList: defines PRACH occasion(s) associated with a CSI-RS in which the MAC entity may transmit a Random Access Preamble;

ra-PreambleStartIndex: the starting index of Random Access Preamble(s) for on-demand SI request;

preambleTransMax: the maximum number of Random Access Preamble transmission;

ssb-perRACH-OccasionAndCB-PreamblesPerSSB: defines the number of SSBs mapped to each PRACH occasion and the number of contention-based Random Access Preambles mapped to each SSB;

if groupBconfigured is configured, then Random Access Preambles group B is configured.

Amongst the contention-based Random Access Preambles associated with an SSB (as defined in TS 38.213 [6]), the first numberOfRA-PreamblesGroupA Random Access Preambles belong to Random Access Preambles group A. The remaining Random Access Preambles associated with the SSB belong to Random Access Preambles group B (if configured).

NOTE 2: If Random Access Preambles group B is supported by the cell Random Access Preambles group B is included for each SSB.

if Random Access Preambles group B is configured:
ra-Msg3SizeGroupA: the threshold to determine the groups of Random Access Preambles;
msg3-DeltaPreamble: DPREAMBLE_Msg3 in TS 38.213 [6];
messagePowerOffsetGroupB: the power offset for preamble selection;
numberOfRA-PreamblesGroupA: defines the number of Random Access Preambles in Random Access Preamble group A for each SSB.

Editor's Note: the configuration of group B preambles for 2-step RACH etc. need to be added above.

the set of Random Access Preambles and/or PRACH occasions for SI request, if any;
the set of Random Access Preambles and/or PRACH occasions for beam failure recovery request, if any;
the set of Random Access Preambles and/or PRACH occasions for reconfiguration with sync, if any;
ra-ResponseWindow: the time window to monitor RA response(s) (SpCell only);
ra-ContentionResolutionTimer: the Contention Resolution Timer (SpCell only).

In addition, the following information for related Serving Cell is assumed to be available for UEs:

if Random Access Preambles group B is configured:
if the Serving Cell for the Random Access procedure is configured with supplementary uplink as specified in TS 38.331 [5], and SUL carrier is selected for performing Random Access Procedure:
$P_{CMAX,f,c}$ of the SUL carrier as specified in TS 38.101-1 [14], TS 38.101-2 [15], and TS 38.101-3 [16].
else:
$P_{CMAX,f,c}$ of the NUL carrier as specified in TS 38.101-1 [14], TS 38.101-2 [15], and TS 38.101-3 [16].

The following UE variables are used for the Random Access procedure:
  Editor's Note: The variables for 2-step random access to be added here
    PREAMBLE_INDEX;
    PREAMBLE_TRANSMISSION_COUNTER;
    PREAMBLE_POWER_RAMPING_COUNTER;
    PREAMBLE_POWER_RAMPING_STEP;
    PREAMBLE_RECEIVED_TARGET_POWER;
    PREAMBLE_BACKOFF;
    PCMAX;
    SCALING_FACTOR_BI;
    TEMPORARY_C-RNTI.
    RA_TYPE.

When the Random Access procedure is initiated on a Serving Cell, the MAC entity shall:
  1> flush the Msg3 buffer;
  1> flush the MSGA buffer;
  1> set the PREAMBLE_TRANSMISSION_COUNTER to 1;
  1> set the PREAMBLE_POWER_RAMPING_COUNTER to 1;
  1> set the PREAMBLE_BACKOFF to 0 ms;
  1> if the carrier to use for the Random Access procedure is explicitly signalled:
    2>select the signalled carrier for performing Random Access procedure;
    2> set the PCMAX to $P_{CMAX,f,c}$ of the signalled carrier.
  1> else if the carrier to use for the Random Access procedure is not explicitly signalled; and
  1> if the Serving Cell for the Random Access procedure is configured with supplementary uplink as specified in TS 38.331 [5]; and
  1> if the RSRP of the downlink pathloss reference is less than rsrp-ThresholdSSB-SUL:
    2>select the SUL carrier for performing Random Access procedure;
    2> set the PCMAX to $P_{CMAX,f,c}$ of the SUL carrier.
  1> else:
    2>select the NUL carrier for performing Random Access procedure;
    2> set the PCMAX to $P_{CMAX,f,c}$ of the NUL carrier.
  1> perform the BWP operation as specified in clause 5.15;
  Editor's Note: It is FFS how to select the RA_TYPE if 4-step CFRA is configured (either for BFR or for HO). The logic below to select the RA_TYPE needs to be updated (and can also be simplified) after the agreements about the 4-step CFRA for BFR/HO.
  1> if random access procedure is initiated by PDCCH order and if the ra-PreambleIndex explicitly provided by PDCCH is not 0b000000; or
  1> if the Random Access procedure was initiated for SI request (as specified in TS 38.331 [5]) and the Random Access Resources for SI request have been explicitly provided by RRC:
    2> set the RA_TYPE to 4-stepRA;
  1> else if the rsrp-ThresholdSSB-2stepCBRA is configured and the RSRP of the downlink pathloss reference is above the configured rsrp-ThresholdSSB-2stepCBRA; or
  1> if the BWP selected for random access procedure is only configured with 2-step random access resources (i.e. no 4-step RACH resources configured):
    2> set the RA_TYPE to 2-stepRA;
  1> else:
    2> set the RA_TYPE to 4-stepRA;

1> if RA_TYPE is set to 2-stepRA:
    2> set PREAMBLE_POWER_RAMPING_STEP to powerRampingStep;
    2> set SCALING_FACTOR_BI to 1;
    2> if the Random Access procedure was initiated for beam failure recovery (as specified in clause 5.17); and
    2> if beamFailureRecoveryConfig is configured for the active UL BWP of the selected carrier:
      3> if powerRampingStepHighPriority is configured in the beamFailureRecoveryConfig:
        4> set PREAMBLE_POWER_RAMPING_STEP to the powerRampingStepHighPriority.
      3> if scalingFactorBI is configured in the beamFailureRecoveryConfig:
        4> set SCALING_FACTOR_BI to the scalingFactorBI.
    2> else if the Random Access procedure was initiated for handover; and
    2> if rach-ConfigDedicated is configured for the selected carrier:
      3> if powerRampingStepHighPriority is configured in the rach-ConfigDedicated:
        4> set PREAMBLE_POWER_RAMPING_STEP to the powerRampingStepHighPriority.
      3> if scalingFactorBI is configured in the rach-ConfigDedicated:
        4> set SCALING_FACTOR_BI to the scalingFactorBI.
    Editor's Note: The above configuration names are FFS. It is also FFS whether these variables are common between 2-step and 4-step RACH. We need to update the variable names and the parameter names depending on the final decision on whether the configuration parameters are common to 2-step and 4-step RACH or not (to be updated based on the RRC parameter email discussion for example).
    2> perform the random access resource selection procedure for 2-step random access (see clause 5.1.2a).
  1> else: (i.e. RA_TYPE is set to 4-stepRA)
    2> set PREAMBLE_POWER_RAMPING_STEP to powerRampingStep;
    2> set SCALING_FACTOR_BI to 1;
    2> if the Random Access procedure was initiated for beam failure recovery (as specified in clause 5.17); and
    2> if beamFailureRecoveryConfig is configured for the active UL BWP of the selected carrier:
      3> start the beamFailureRecoveryTimer, if configured;
      3> apply the parameters powerRampingStep, preambleReceivedTargetPower, and preambleTransMax configured in the beamFailureRecoveryConfig;
      3> if powerRampingStepHighPriority is configured in the beamFailureRecoveryConfig:
        4> set PREAMBLE_POWER_RAMPING_STEP to the powerRampingStepHighPriority.
      3> if scalingFactorBI is configured in the beamFailureRecoveryConfig:
        4> set SCALING_FACTOR_BI to the scalingFactorBI.
    2> else if the Random Access procedure was initiated for handover; and
    2> if rach-ConfigDedicated is configured for the selected carrier:
      3> if powerRampingStepHighPriority is configured in the rach-ConfigDedicated:

4> set PREAMBLE_POWER_RAMPING_STEP to the powerRampingStepHighPriority.
   3> if scalingFactorBI is configured in the rach-ConfigDedicated:
      4> set SCALING_FACTOR_BI to the scalingFactorBI.
2> perform the Random Access Resource selection procedure (see clause 5.1.2).

5.1.2 Random Access Resource Selection

The MAC entity shall:
1> if the Random Access procedure was initiated for beam failure recovery (as specified in clause 5.17); and
1> if the beamFailureRecoveryTimer (in clause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2>select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in TS 38.214 [7].
   2> else:
      3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2>select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2>select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2>select a CSI-RS with CSI-RSRP above rsrp-ThresholdCSI-RS amongst the associated CSI-RSS;
   2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
      3>select an SSB with SS-RSRP above rsrp-ThresholdSSB.
   2> else:
      3>select any SSB.
   2>select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
1> else (i.e. for the contention-based Random Access preamble selection):
   2> if at least one of the SSBs with SS-RSRP above rsrp-ThresholdSSB is available:
      3>select an SSB with SS-RSRP above rsrp-ThresholdSSB.
   2> else:
      3>select any SSB.
   2> if Msg3 buffer is not empty:
      3> if Random Access Preambles group B is configured:
         4> if the potential Msg3 size (UL data available for transmission plus MAC header and, where required, MAC CEs) is greater than ra-Msg3SizeGroupA and the pathloss is less than PCMAX (of the Serving Cell performing the Random Access Procedure)—preambleReceivedTargetPower-msg3-DeltaPreamble-messagePowerOffsetGroupB; or
         4> if the Random Access procedure was initiated for the CCCH logical channel and the CCCH SDU size plus MAC subheader is greater than ra-Msg3SizeGroupA:
            5>select the Random Access Preambles group B.
         4> else:
            5>select the Random Access Preambles group A.
      3> else:
         4>select the Random Access Preambles group A.
   2> else (i.e. Msg3 is being retransmitted):
      3>select the same group of Random Access Preambles as was used for the Random Access Preamble transmission attempt corresponding to the first transmission of Msg3.
   2>select a Random Access Preamble randomly with equal probability from the Random Access Preambles associated with the selected SSB and the selected Random Access Preambles group.
   2> set the PREAMBLE_INDEX to the selected Random Access Preamble.
1> if the Random Access procedure was initiated for SI request (as specified in TS 38.331 [5]); and
1> if ra-AssociationPeriodIndex and si-RequestPeriod are configured:
   2>determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity shall select a PRACH occasion randomly with equal probability amongst the consecutive PRACH occasions according to clause 8.1 of TS 38.213 [6] corresponding to the selected SSB).

1> else if an SSB is selected above:
  2>determine the next available PRACH occasion from the PRACH occasions corresponding to the selected SSB permitted by the restrictions given by the ra-ssb-OccasionMaskIndex if configured or indicated by PDCCH (the MAC entity shall select a PRACH occasion randomly with equal probability amongst the consecutive PRACH occasions according to clause 8.1 of TS 38.213 [6], corresponding to the selected SSB; the MAC entity may take into account the possible occurrence of measurement gaps when determining the next available PRACH occasion corresponding to the selected SSB).
1> else if a CSI-RS is selected above:
  2> if there is no contention-free Random Access Resource associated with the selected CSI-RS:
    3>determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS as specified in TS 38.214 [7] (the MAC entity shall select a PRACH occasion randomly with equal probability amongst the consecutive PRACH occasions according to clause 8.1 of TS 38.213 [6], corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
  2> else:
    3>determine the next available PRACH occasion from the PRACH occasions in ra-OccasionList corresponding to the selected CSI-RS (the MAC entity shall select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1> perform the Random Access Preamble transmission procedure (see clause 5.1.3).
NOTE: When the UE determines if there is an SSB with SS-RSRP above rsrp-ThresholdSSB or a CSI-RS with CSI-RSRP above rsrp-ThresholdCSI-RS, the UE uses the latest unfiltered L1-RSRP measurement.

5.1.2a Random Access Resource Selection for 2-Step Random Access

The MAC entity shall:
1> if at least one of the SSBs with SS-RSRP above rsrp-ThresholdSSB is available:
  2>select an SSB with SS-RSRP above rsrp-ThresholdSSB.
1> else:
  2>select any SSB.
1> if MSGA has not yet been transmitted:
  2> if Random Access Preambles group B for 2-step RA is configured:
    3> if the potential MSGA payload size (UL data available for transmission plus MAC header and, where required, MAC CEs) is greater than [ra-MsgASizeGroupA] and the pathloss is less than PCMAX (of the Serving Cell performing the Random Access Procedure)−[preambleReceivedTargetPower]−[msgA-DeltaPreamble]−[messagePowerOffsetGroupB]; or
    3> if the Random Access procedure was initiated for the CCCH logical channel and the CCCH SDU size plus MAC subheader is greater than [ra-MsgASizeGroupA]:
      4>select the Random Access Preambles group B.
    3> else:
      4>select the Random Access Preambles group A.
  2> else:
    3>select the Random Access Preambles group A.
1> else (i.e. MSGA is being retransmitted):
  2>select the same group of Random Access Preambles as was used for the Random Access Preamble transmission attempt corresponding to the first transmission of MSGA.

Editor's Note: The variable names above and whether these are same or different to corresponding variables in 4-step RACH is FFS.

1>select a Random Access Preamble randomly with equal probability from the 2-step Random Access Preambles associated with the selected SSB and the selected Random Access Preambles group;
1> set the PREAMBLE_INDEX to the selected Random Access Preamble;
1>determine the next available PRACH occasion from the PRACH occasions corresponding to the selected SSB (the MAC entity shall select a PRACH occasion randomly with equal probability among the consecutive PRACH occasions allocated for 2-step random access according to subclause 8.1 of TS 38.213 [6], corresponding to the selected SSB; the MAC entity may take into account the possible occurrence of measurement gaps when determining the next available PRACH occasion corresponding to the selected SSB);
1>determine the UL grant and the associated HARQ information for the PUSCH resource of MSGA associated with the selected preamble and PRACH occasion according to subclause x of TS 38.213 [6];
1>deliver the UL grant and the associated HARQ information to the HARQ entity; Editor's Note: The aspects related to the selection of PUSCH resource and payload size of MSGA are FFS (pending RAN1 input). The above sentence can be changed based on further discussion in RAN2 and RAN1 hence.
1> perform the MSGA transmission procedure (see subclause 5.1.3a).

NOTE: To determine if there is an SSB with SS-RSRP above rsrp-ThresholdSSB, the UE uses the latest unfiltered L1-RSRP measurement.

The configurations of the thresholds in the RA procedure could be provided by Radio Resource Control (RRC), as specified in 3GPP TS 38.331 as follows:

ServingCellConfig

The IE ServingCellConfig is used to configure (add or modify) the UE with a serving cell, which may be the SpCell or an SCell of an MCG or SCG. The parameters herein are mostly UE specific but partly also cell specific (e.g. in additionally configured bandwidth parts). Reconfiguration between a PUCCH and PUCCHless SCell is only supported using an SCell release and add.

| ServingCellConfig information element |
|---|

```
-- ASN1START
-- TAG-SERVINGCELLCONFIG-START
ServingCellConfig ::=                    SEQUENCE {
    tdd-UL-DL-ConfigurationDedicated     TDD-UL-DL-ConfigDedicated
OPTIONAL,  -- Cond TDD
    initialDownlinkBWP                   BWP-DownlinkDedicated
OPTIONAL,  -- Need M
    downlinkBWP-ToReleaseList            SEQUENCE (SIZE (1..maxNrofBWPs)) OF BWP-Id
OPTIONAL,  -- Need N
    downlinkBWP-ToAddModList             SEQUENCE (SIZE (1..maxNrofBWPs)) OF BWP-Downlink
OPTIONAL,  -- Need N
    firstActiveDownlinkBWP-Id            BWP-Id
OPTIONAL,  -- Cond SyncAndCellAdd
    bwp-InactivityTimer                  ENUMERATED {ms2, ms3, ms4, ms5, ms6, ms8, ms10, ms20,
ms30,
                                            ms40, ms50, ms60, ms80, ms100, ms200, ms300,
ms500,
                                            ms750, ms1280, ms1920, ms2560, spare10,
spare9, spare8,
                                            spare7, spare6, spare5, spare4, spare3,
spare2, spare1 }   OPTIONAL,   -- Need R
    defaultDownlinkBWP-Id                BWP-Id
OPTIONAL,  -- Need S
    uplinkConfig                         UplinkConfig
OPTIONAL,  -- Need M
    supplementaryUplink                  UplinkConfig
OPTIONAL,  -- Need M
    pdcch-ServingCellConfig              SetupRelease { PDCCH-ServingCellConfig }
OPTIONAL,  -- Need M
    pdsch-ServingCellConfig              SetupRelease { PDSCH-ServingCellConfig }
OPTIONAL,  -- Need M
    csi-MeasConfig                       SetupRelease { CSI-MeasConfig }
OPTIONAL,  -- Need M
    sCellDeactivationTimer               ENUMERATED {ms20, ms40, ms80, ms160, ms200, ms240,
                                            ms320, ms400, ms480, ms520, ms640, ms720,
                                            ms840, ms1280, spare2,spare1}   OPTIONAL,
-- Cond ServingCellWithoutPUCCH
    crossCarrierSchedulingConfig         CrossCarrierSchedulingConfig
OPTIONAL,  -- Need M
    tag-Id                               TAG-Id,
    dummy                                ENUMERATED {enabled}
OPTIONAL,  -- Need R
    pathlossReferenceLinking             ENUMERATED {spCell, sCell}
OPTIONAL,  -- Cond SCellOnly
    servingCellMO                        MeasObjectId
OPTIONAL,  -- Cond MeasObject
    ...,
    [[
    lte-CRS-ToMatchAround                SetupRelease { RateMatchPatternLTE-CRS }
OPTIONAL,  -- Need M
    rateMatchPatternToAddModList         SEQUENCE (SIZE (1..maxNrofRateMatchPatterns)) OF
RateMatchPattern   OPTIONAL   -- Need N
    rateMatchPatternToReleaseList        SEQUENCE (SIZE (1..maxNrofRateMatchPatterns)) OF
RateMatchPatternId   OPTIONAL   -- Need N
    downlinkChannelBW-PerSCS-List        SEQUENCE (SIZE (1..maxSCSs)) OF SCS-SpecificCarrier
OPTIONAL   Need S
    ]]
}
UplinkConfig ::=                         SEQUENCE {
    initialUplinkBWP                     BWP-UplinkDedicated
OPTIONAL,  -- Need M
    uplinkBWP-ToReleaseList              SEQUENCE (SIZE (1..maxNrofBWPs)) OF BWP-Id
OPTIONAL,  -- Need N
    uplinkBWP-ToAddModList               SEQUENCE (SIZE (1..maxNrofBWPs)) OF BWP-Uplink
OPTIONAL,  -- Need N
    firstActiveUplinkBWP-Id              BWP-Id
OPTIONAL,  -- Cond SyncAndCellAdd
    pusch-ServingCellConfig              SetupRelease { PUSCH-ServingCellConfig }
OPTIONAL,  -- Need M
    carrierSwitching                     SetupRelease { SRS-CarrierSwitching }
OPTIONAL,  -- Need M
    ...,
    [[
    powerBoostPi2BPSK                    BOOLEAN
OPTIONAL,  -- Need
    uplinkChannelBW-PerSCS-List          SEQUENCE (SIZE (1..maxSCSs) ) OF SCS-SpecificCarrier
OPTIONAL   -- Need S
    ]]
}
```

-continued

| ServingCellConfig information element |
|---|

-- TAG-SERVINGCELLCONFIG-STOP
-- ASN1STOP

| ServingCellConfig field descriptions |
|---|
| bwp-InactivityTimer |

The duration in ms after which the UE falls back to the default Bandwidth Part (see TS 38.321 [3], clause 5.15). When the network releases the timer configuration, the UE stops the timer without switching to the default BWP.

| crossCarrierSchedulingConfig |
|---|

Indicates whether this serving cell is cross-carrier scheduled by another serving cell or whether it cross-carrier schedules another serving cell.

| defaultDownlinkBWP-Id |
|---|

The initial bandwidth part is referred to by BWP-Id = 0. ID of the downlink bandwidth part to be used upon expiry of the BWP inactivity timer. This field is UE specific. When the field is absent the UE uses the initial BWP as default BWP. (see TS 38.213 [13], clause 12 and TS 38.321 [3], clause 5.15).

| downlinkBWP-ToAddModList |
|---|

List of additional downlink bandwidth parts to be added or modified. (see TS 38.213 [13], clause 12).

| downlinkBWP-ToReleaseList |
|---|

List of additional downlink bandwidth parts to be released. (see TS 38.213 [13], clause 12).

| downlinkChannelBW-PerSCS-List |
|---|

A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in scs-SpecificCarrierList in DownlinkConfigCommon/ DownlinkConfigCommonSIB. Network only configures channel bandwidth that corresponds to the channel bandwidth values defined in TS 38.101-1 [15] and TS 38.101-2 [39].

| firstActiveDownlinkBWP-Id |
|---|

If configured for an SpCell, this field contains the ID of the DL BWP to be activated upon performing the RRC (re-)configuration. If the field is absent, the RRC (re-)configuration does not impose a BWP switch.
If configured for an SCell, this field contains the ID of the downlink bandwidth part to be used upon MAC-activation of an SCell. The initial bandwidth part is referred to by BWP-Id = 0.
Upon PCell change and PSCell addition/change, the network sets the firstActiveDownlinkBWP-Id and firstActiveUplinkBWP-Id to the same value.

| initialDownlinkBWP |
|---|

The dedicated (UE-specific) configuration for the initial downlink bandwidth-part (i.e. DL BWP#0). If any of the optional IEs are configured within this IE, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1

| lte-CRS-ToMatchAround |
|---|

Parameters to determine an LTE CRS pattern that the UE shall rate match around.

| pathlossReferenceLinking |
|---|

Indicates whether UE shall apply as pathloss reference either the downlink of SpCell (PCell for MCG or PSCell for SCG) or of SCell that corresponds with this uplink (see TS 38.213 [13], clause 7).

| pdsch-ServingCellConfig |
|---|

PDSCH related parameters that are not BWP-specific.

| rateMatchPatternToAddModList |
|---|

Resources patterns which the UE should rate match PDSCH around. The UE rate matches around the union of all resources indicated in the rate match patterns. Rate match patterns defined here on cell level apply only to PDSCH of the same numerology. See TS 38.214 [19], clause 5.1.2.2.3.

| sCellDeactivationTimer |
|---|

SCell deactivation timer in TS 38.321 [3]. If the field is absent, the UE applies the value infinity.

-continued

| ServingCellConfig field descriptions |
|---|
| servingCellMO | measObjectId of the MeasObjectNR in MeasConfig which is associated to the serving cell. For this MeasObjectNR, the following relationship applies between this MeasObjectNR and frequencyInfoDL in ServingCellConfigCommon of the serving cell: if ssbFrequency is configured, its value is the same as the absoluteFrequencySSB and if csi-rs-ResourceConfigMobility is configured, the value of its subcarrierSpacing is present in one entry of the scs-SpecificCarrierList, csi-RS-CellListMobility includes an entry corresponding to the serving cell (with cellId equal to physCellId in ServingCellConfigCommon) and the frequency range indicated by the csi-rs-MeasurementBW of the entry in csi-RS-CellListMobility is included in the frequency range indicated by in the entry of the scs-SpecificCarrierList.

| supplementaryUplink |
|---|

Network may configure this field only when supplementaryUplinkConfig is configured in ServingCellConfigCommon or ServingCellConfigCommonSIB.

| tag-Id |
|---|

Timing Advance Group ID, as specified in TS 38.321 [3], which this cell belongs to.

| uplinkConfig |
|---|

Network may configure this field only when uplinkConfigCommon is configured in ServingCellConfigCommon or ServingCellConfigCommonSIB.

| UplinkConfig field descriptions |
|---|
| carrierSwitching |

Includes parameters for configuration of carrier based SRS switching (see TS 38.214 [19], clause 6.2.1.3.

| firstActiveUplinkBWP-Id |
|---|

If configured for an SpCell, this field contains the ID of the UL BWP to be activated upon performing the RRC (re-)configuration. If the field is absent, the RRC (re-)configuration does not impose a BWP switch.
If configured for an SCell, this field contains the ID of the uplink bandwidth part to be used upon MAC-activation of an SCell. The initial bandwidth part is referred to by BandiwdthPartId = 0.

| initialUplinkBWP |
|---|

The dedicated (UE-specific) configuration for the initial uplink bandwidth-part (i.e. UL BWP#0). If any of the optional IEs are configured within this IE as part of the IE uplinkConfig, the UE considers the BWP#0 to be an RRC configured BWP (from UE capability viewpoint). Otherwise, the UE does not consider the BWP#0 as an RRC configured BWP (from UE capability viewpoint). Network always configures the UE with a value for this field if no other BWPs are configured. NOTE1

| powerBoostPi2BPSK |
|---|

If this field is set to true, the UE determines the maximum output power for PUCCH/PUSCH transmissions that use pi/2 BPSK modulation according to TS 38.101-1 [15], clause 6.2.4.

| pusch-ServingCellConfig |
|---|

PUSCH related parameters that are not BWP-specific.

| uplinkBWP-ToAddModList |
|---|

The additional bandwidth parts for uplink to be added or modified. In case of TDD uplink- and downlink BWP with the same bandwidthPartId are considered as a BWP pair and must have the same center frequency.

| uplinkBWP-ToReleaseList |
|---|

The additional bandwidth parts for uplink to be released.

| uplinkChannelBW-PerSCS-List |
|---|

A set of UE specific channel bandwidth and location configurations for different subcarrier spacings (numerologies). Defined in relation to Point A. The UE uses the configuration provided in this field only for the purpose of channel bandwidth and location determination. If absent, UE uses the configuration indicated in scs-SpecificCarrierList in UplinkConfigCommon/UplinkConfigCommonSIB. Network only configures channel bandwidth that corresponds to the channel bandwidth values defined in TS 38.101-1 [15] and TS 38.101-2 [39].

NOTE 1: If the dedicated part of initial UL/DL BWP configuration is absent, the initial BWP can be used but with some limitations. For example, changing to another BWP requires RRCReconfiguration since DCI format 1_0 doesn't support DCI-based switching.

| Conditional Presence | Explanation |
| --- | --- |
| MeasObject | This field is mandatory present for the SpCell if the UE has a measConfig, and it is optionally present, Need M, for SCells. |
| SCellOnly | This field is optionally present, Need R, for SCells. It is absent otherwise. |
| ServingCellWithoutPUCCH | This field is optionally present, Need S, for SCells except PUCCH SCells. It is absent otherwise. |
| SyncAndCellAdd | This field is mandatory present for a SpCell upon PCell change and PSCell addition/change and upon RRCSetup/RRCResume. The field is mandatory present for an SCell upon addition. For SpCell, the field is optionally present, Need N, upon reconfiguration without reconfigurationWithSync. In all other cases the field is absent. |
| TDD | This field is optionally present, Need R, for TDD cells. It is absent otherwise. |

[ . . . ]

BWP-Uplink

The IE BWP-Uplink is used to configure an additional uplink bandwidth part (not for the initial BWP).

```
            BWP-Uplink information element
-- ASN1START
-- TAG-BWP-UPLINK-START
BWP-Uplink ::=                    SEQUENCE {
    bwp-Id                            BWP-Id,
    bwp-Common                        BWP-UplinkCommon
OPTIONAL,   -- Cond SetupOtherBWP
    bwp-Dedicated                     BWP-UplinkDedicated
OPTIONAL,   -- Cond SetupOtherBWP
    ...
}
-- TAG-BWP-UPLINK-STOP
-- ASN1STOP
```

| BWP-Uplink field descriptions |
| --- |
| bwp-Id |
| An identifier for this bandwidth part. Other parts of the RRC configuration use the BWP-Id to associate themselves with a particular bandwidth part. The network configures the BWPs with consecutive IDs from 1. The Network does not include the value 0, since value 0 is reserved for the initial BWP. |

| Conditional Presence | Explanation |
| --- | --- |
| SetupOtherBWP | The field is mandatory present upon configuration of a new UL BWP. The field is optionally present, Need M, otherwise. |

BWP-UplinkCommon

The IE BWP-UplinkCommon is used to configure the common parameters of an uplink BWP. They are "cell specific" and the network ensures the necessary alignment with corresponding parameters of other UEs. The common parameters of the initial bandwidth part of the PCell are also provided via system information. For all other serving cells, the network provides the common parameters via dedicated signalling.

| BWP-UplinkCommon information element |
|---|
| ```
-- ASN1START
-- TAG-BWP-UPLINKCOMMON-START
BWP-UplinkCommon ::=            SEQUENCE {
  genericParameters             BWP,
  rach-ConfigCommon             SetupRelease { RACH-ConfigCommon }  OPTIONAL, -- Need M
  pusch-ConfigCommon            SetupRelease { PUSCH-ConfigCommon } OPTIONAL, -- Need M
  pucch-ConfigCommon            SetupRelease { PUCCH-ConfigCommon } OPTIONAL, -- Need M
  ...
}
-- TAG-BWP-UPLINKCOMMON-STOP
-- ASN1STOP
``` |

| BWP-UplinkCommon field descriptions |
|---|
| pucch-ConfigCommon |
| Cell specific parameters for the PUCCH of this BWP. |
| pusch-ConfigCommon |
| Cell specific parameters for the PUSCH of this BWP. |
| rach-ConfigCommon |
| Configuration of cell specific random access parameters which the UE uses for contention based and contention free random access as well as for contention based beam failure recovery in this BWP. The NW configures SSB-based RA (and hence RACH-ConfigCommon) only for UL BWPs if the linked DL BWPs (same bwp-Id as UL-BWP) are the initial DL BWPs or DL BWPs containing the SSB associated to the initial DL BWP. The network configures rach-ConfigCommon, whenever it configures contention free random access (for reconfiguration with sync or for beam failure recovery). |

[ ... ]

RACH-ConfigCommon
The IE RACH-ConfigCommon is used to specify the cell specific random-access parameters.

```
-- ASN1START
-- TAG-RACH-CONFIGCOMMON-START
RACH-ConfigCommon ::=
  rach-ConfigGeneric                              RACH-ConfigGeneric,
  totalNumberOfRA-Preambles                       INTEGER (1..63)  OPTIONAL, -- Need S
  ssb-perRACH-OccasionAndCB-PreamblesPerSSB       CHOICE {
    oneEighth                                     ENUMERATED {n4,n8,n12,n16,n20,n24,n28,n32,n36,n40,n44,n48,n52,n56,n60,n64},
    oneFourth                                     ENUMERATED {n4,n8,n12,n16,n20,n24,n28,n32,n36,n40,n44,n48,n52,n56,n60,n64},
    oneHalf                                       ENUMERATED {n4,n8,n12,n16,n20,n24,n28,n32,n36,n40,n44,n48,n52,n56,n60,n64},
    one                                           ENUMERATED {n4,n8,n12,n16,n20,n24,n28,n32,n36,n40,n44,n48,n52,n56,n60,n64},
    two                                           ENUMERATED {n4,n8,n12,n16,n20,n24,n28,n32},
    four                                          INTEGER (1..16),
    eight                                         INTEGER (1..8),
    sixteen                                       INTEGER (1..4)
  }                                               OPTIONAL, -- Need M
  groupBconfigured                                SEQUENCE {
    ra-Msg3SizeGroupA                             ENUMERATED {b56, b144, b208, b256, b282, b480, b640, b800, b1000, b72, spare6, spare5, spare4, spare3, spare2, spare1},
    messagePowerOffsetGroupB                      ENUMERATED { minusinfinity, dB0, dB5, dB8, dB10, dB12, dB15, dB18},
    numberOfRA-PreamblesGroupA                    INTEGER (1..64)
  }
```

-continued

```
OPTIONAL,   -- Need R
    ra-ContentionResolutionTimer              ENUMERATED { sf8, sf16, sf24, sf32, sf40, sf48, sf56,
sf64},
    rsrp-ThresholdSSB                         RSRP-Range
OPTIONAL,   -- Need R
    rsrp-ThresholdSSB-SUL                     RSRP-Range
OPTIONAL,   -- Cond SUL
    prach-Root Sequence Index                 CHOICE {
        1839                                      INTEGER (0..837),
        1139                                      INTEGER (0..137)
    },
    msg1-SubcarrierSpacing                    SubcarrierSpacing
OPTIONAL,   -- Cond L139
    restrictedSetConfig                       ENUMERATED {unrestrictedSet, restrictedSetTypeA,
restrictedSetTypeB},
    msg3-transformPrecoder                    ENUMERATED {enabled}
OPTIONAL,   -- Need R
    ...
}
-- TAG-RACH-CONFIGCOMMON-STOP
-- ASN1STOP
```

| RACH-ConfigCommon field descriptions |
|---|
| messagePowerOffsetGroupB |
| Threshold for preamble selection. Value is in dB. Value minusinfinity corresponds to -infinity. Value dB0 corresponds to 0 dB, dB5 corresponds to 5 dB and so on. (see TS 38.321 [3], clause 5.1.2) |
| msg1-SubcarrierSpacing |
| Subcarrier spacing of PRACH (see TS 38.211 [16], clause 5.3.2). Only the values 15 or 30 kHz (FR1), and 60 or 120 kHz (FR2) are applicable. If absent, the UE applies the SCS as derived from the prach-ConfigurationIndex in RACH-ConfigGeneric (see tables Table 6.3.3.1-1 and Table 6.3.3.2-2, TS 38.211 [16]). The value also applies to contention free random access (RACH-ConfigDedicated), to SI-request and to contention-based beam failure recovery (CB-BFR). But it does not apply for contention free beam failure recovery (CF-BFR) (see BeamFailureRecoveryConfig). |
| msg3-transformPrecoder |
| Enables the transform precoder for Msg3 transmission according to clause 6.1.3 of TS 38.214 [19]. If the field is absent, the UE disables the transformer precoder (see TS 38.213 [13], clause 8.3). |
| numberOfRA-PreamblesGroupA |
| The number of CB preambles per SSB in group A. This determines implicitly the number of CB preambles per SSB available in group B. (see TS 38.321 [3], clause 5.1.1). The setting should be consistent with the setting of ssb-perRACH-OccasionAndCB-PreamblesPerSSB. |
| prach-RootSequenceIndex |
| PRACH root sequence index (see TS 38.211 [16], clause 6.3.3.1). The value range depends on whether L = 839 or L = 139. The short/long preamble format indicated in this IE should be consistent with the one indicated in prach-ConfigurationIndex in the RACH-ConfigDedicated (if configured). |
| ra-ContentionResolutionTimer |
| The initial value for the contention resolution timer (see TS 38.321 [3], clause 5.1.5). Value sf8 corresponds to 8 subframes, value sf16 corresponds to 16 subframes, and so on. |
| ra-Msg3SizeGroupA |
| Transport Blocks size threshold in bits below which the UE shall use a contention-based RA preamble of group A. (see TS 38.321 [3], clause 5.1.2). |
| rach-ConfigGeneric |
| RACH parameters for both regular random access and beam failure recovery. |
| restrictedSetConfig |
| Configuration of an unrestricted set or one of two types of restricted sets, see TS 38.211 [16], clause 6.3.3.1. |
| rsrp-ThresholdSSB |
| UE may select the SS block and corresponding PRACH resource for path-loss estimation and (re)transmission based on SS blocks that satisfy the threshold (see TS 38.213 [13]). |
| rsrp-ThresholdSSB-SUL |
| The UE selects SUL carrier to perform random access based on this threshold (see TS 38.321 [3], clause 5.1.1). The value applies to all the BWPs. |

| RACH-ConfigCommon field descriptions |
|---|
| ssb-perRACH-OccasionAndCB-PreamblesPerSSB |
| The meaning of this field is twofold: the CHOICE conveys the information about the number of SSBs per RACH occasion. Value oneEight corresponds to one SSB associated with 8 RACH occasions, value oneFourth corresponds to one SSB associated with 4 RACH occasions, and so on. The ENUMERATED part indicates the number of Contention Based preambles per SSB. Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). See TS 38.213 [13]. |
| totalNumberOfRA-Preambles |
| Total number of preambles used for contention based and contention free random access in the RACH resources defined in RACH-ConfigCommon, excluding preambles used for other purposes (e.g. for SI request). If the field is absent, all 64 preambles are available for RA. The setting should be consistent with the setting of ssb-perRACH-OccasionAndCB-PreamblesPerSSB, i.e. it should be a multiple of the number of SSBs per RACH occasion. |

| Conditional Presence | Explanation |
|---|---|
| L139 | The field is mandatory present if prach-RootSequenceIndex L = 139, otherwise the field is absent, Need S. |
| SUL | The field is mandatory present in initialUplinkBWP in supplementaryUplink; otherwise, the field is absent. |

In LTE, the description of early data transmission (EDT) for user plane in RRC_IDLE state is specified in 3GPP TS 36.300 as follows:
7.3b EDT
7.3b.1 General
EDT allows one uplink data transmission optionally followed by one downlink data transmission during the random access procedure.
EDT is triggered when the upper layers have requested the establishment or resumption of the RRC Connection for Mobile Originated data (i.e., not signalling or SMS) and the uplink data size is less than or equal to a TB size indicated in the system information. EDT is not used for data over the control plane when using the User Plane CIoT EPS optimizations.
EDT is only applicable to BL UEs, UEs in Enhanced Coverage and NB-IoT UEs.
In LTE, the RA procedure with early data transmission (EDT) in RRC_IDLE state is specified in 3GPP TS 36.321 as follows:
5.1.2 Random Access Resource Selection
The Random Access Resource selection procedure shall be performed as follows:
for BL UEs or UEs in enhanced coverage or NB-IoT UEs, if EDT is initiated by the upper layers:
if the message size (UL data available for transmission plus MAC header and, where required, MAC control elements) is larger than the TB size signalled in edt-TBS for the selected enhanced coverage level for EDT; or
if the PRACH resource associated with EDT for the selected enhanced coverage level is not available:
indicate to upper layers that EDT is cancelled;
for BL UEs or UEs in enhanced coverage, select the PRACH resource set corresponding to the selected enhanced coverage level. For EDT, the PRACH resource set shall correspond to the set associated with EDT for the selected enhanced coverage level.
if, except for NB-IoT, ra-PreambleIndex (Random Access Preamble) and ra-PRACH-MaskIndex (PRACH Mask Index) have been explicitly signalled and ra-PreambleIndex is not 000000:
the Random Access Preamble and the PRACH Mask Index are those explicitly signalled;
else if, for NB-IoT, ra-PreambleIndex (Random Access Preamble) and PRACH resource have been explicitly signalled:
the PRACH resource is that explicitly signalled;
if the ra-PreambleIndex signalled is not 000000:
if ra-CFRA-Config is configured:
the Random Access Preamble is set to nprach-SubcarrierOffset+nprach-NumCBRA-StartSubcarriers+ (ra-PreambleIndex modulo (nprach-NumSubcarriers
nprach-NumCBRA-StartSubcarriers)), where nprach-SubcarrierOffset, nprach-NumCBRA-StartSubcarriers and nprach-NumSubcarriers are parameters in the currently used PRACH resource.
else:
the Random Access Preamble is set to nprach-SubcarrierOffset+ (ra-PreambleIndex modulo nprach-NumSubcarriers), where nprach-SubcarrierOffset and nprach-NumSubcarriers are parameters in the currently used PRACH resource.
else:
select the Random Access Preamble group according to the PRACH resource and the support for multi-tone Msg3 transmission. A UE supporting multi-tone Msg3 shall only select the single-tone Msg3 Random Access Preambles group if there is no multi-tone Msg3 Random Access Preambles group.
randomly select a Random Access Preamble within the selected group.
else the Random Access Preamble shall be selected by the MAC entity as follows:
if the UE is a BLUE or UE in enhanced coverage and EDT is initiated:
select the Random Access Preambles group corresponding to PRACH resource for EDT for the selected enhanced coverage level.
else if the UE is a BLUE or UE in enhanced coverage and Random Access Preamble group B does not exist:

select the Random Access Preambles group corresponding to the selected enhanced coverage level.
else if the UE is an NB-IoT UE:
1 randomly select one of the PRACH resources corresponding to the selected enhanced coverage level according to the configured probability distribution, and select the Random Access Preambles group corresponding to the PRACH resource and the support for multi-tone Msg3 transmission. A UE supporting multi-tone Msg3 shall only select the single-tone Msg3 Random Access Preambles group if there is no multi-tone Msg3 Random Access Preambles group. For EDT, the PRACH resource shall correspond to resource associated with EDT for the selected enhanced coverage level.
else if Msg3 has not yet been transmitted, the MAC entity shall:
if Random Access Preambles group B exists and any of the following events occur:
the potential message size (UL data available for transmission plus MAC header and, where required, MAC control elements) is greater than messageSizeGroupA and the pathloss is less than $P_{CMAX,c}$ (of the Serving Cell performing the Random Access Procedure)—preambleInitialReceivedTargetPower-deltaPreambleMsg3 messagePowerOffsetGroupB;
the Random Access procedure was initiated for the CCCH logical channel and the CCCH SDU size plus MAC header is greater than messageSizeGroupA;
select the Random Access Preambles group B;
else:
select the Random Access Preambles group A.
else, if Msg3 is being retransmitted, the MAC entity shall:
select the same group of Random Access Preambles as was used for the preamble transmission attempt corresponding to the first transmission of Msg3.
randomly select a Random Access Preamble within the selected group. The random function shall be such that each of the allowed selections can be chosen with equal probability;
except for NB-IoT, set PRACH Mask Index to 0.
determine the next available subframe containing PRACH permitted by the restrictions given by the prach-ConfigIndex (except for NB-IoT), the PRACH Mask Index (except for NB-IoT, see clause 7.3), physical layer timing requirements, as specified in TS 36.213 [2], and in case of NB-IoT, the subframes occupied by PRACH resources related to a higher enhanced coverage level (a MAC entity may take into account the possible occurrence of measurement gaps when determining the next available PRACH subframe);
except for NB-IoT:
if the transmission mode is TDD and the PRACH Mask Index is equal to zero:
if ra-PreambleIndex was explicitly signalled and it was not 000000 (i.e., not selected by MAC):
randomly select, with equal probability, one PRACH from the PRACHs available in the determined subframe.
else:
randomly select, with equal probability, one PRACH from the PRACHs available in the determined subframe and the next two consecutive subframes.

else:
determine a PRACH within the determined subframe in accordance with the requirements of the PRACH Mask Index, if any.
for NB-IoT UEs, BL UEs or UEs in enhanced coverage, select the ra-ResponseWindowSize and mac-ContentionResolutionTimer corresponding to the selected enhanced coverage level and PRACH.
proceed to the transmission of the Random Access Preamble (see clause 5.1.3).

The work item of small data transmissions in INACTIVE state in $N_R$ has been approved in RAN plenary #86 meeting. The description of the work item is specified in 3GPP RP-193252 as follows:

3 Justification $N_R$ supports RRC_INACTIVE state and UEs with infrequent (periodic and/or non-periodic) data transmission are generally maintained by the network in the RRC_INACTIVE state. Until Rel-16, the RRC_INACTIVE state doesn't support data transmission. Hence, the UE has to resume the connection (i.e. move to RRC_CONNECTED state) for any DL (MT) and UL (MO) data. Connection setup and subsequently release to INACTIVE state happens for each data transmission however small and infrequent the data packets are. This results in unnecessary power consumption and signalling overhead.

Specific examples of small and infrequent data traffic include the following use cases:
Smartphone applications:
Traffic from Instant Messaging services (whatsapp, QQ, wechat etc.)
Heart-beat/keep-alive traffic from IM/email clients and other apps
Push notifications from various applications
Non-smartphone applications:
Traffic from wearables (periodic positioning information etc.)
sensors (Industrial Wireless Sensor Networks transmitting temperature, pressure readings periodically or in an event triggered manner etc.)
smart meters and smart meter networks sending periodic meter readings As noted in 3GPP TR 22.891, the $N_R$ system shall:
be efficient and flexible for low throughput short data bursts
support efficient signalling mechanisms (e.g. signalling is less than payload)
reduce signalling overhead in general Signalling overhead from INACTIVE state UEs for small data packets is a general problem and will become a critical issue with more UEs in $N_R$ not only for network performance and efficiency but also for the UE battery performance. In general, any device that has intermittent small data packets in INACTIVE state will benefit from enabling small data transmission in INACTIVE.

The key enablers for small data transmission in $N_R$, namely the INACTIVE state, 2-step, 4-step RACH and configured grant type-1 have already been specified as part of Rel-15 and Rel-16. So, this work builds on these building blocks to enable small data transmission in INACTIVE state for $N_R$.

4 Objective

4.1 Objective of SI or Core part WI or Testing part WI

This work item enables small data transmission in RRC_INACTIVE state as follows:

For the RRC_INACTIVE state:
  UL small data transmissions for RACH-based schemes (i.e. 2-step and 4-step RACH):
    "General procedure to enable UP data transmission for small data packets from INACTIVE state (e.g. using MSGA or MSG3) [RAN2]"
    Enable flexible payload sizes larger than the Rel-16 CCCH message size that is possible currently for INACTIVE state for MSGA and MSG3 to support UP data transmission in UL (actual payload size can be up to network configuration) [RAN2]
    Context fetch and data forwarding (with and without anchor relocation) in INACTIVE state for RACH-based solutions [RAN2, RAN3]
    Note 1: The security aspects of the above solutions should be checked with SA3
    Transmission of UL data on pre-configured PUSCH resources (i.e. reusing the configured grant type 1)—when TA is valid
      General procedure for small data transmission over configured grant type 1 resources from INACTIVE state [RAN2]
      Configuration of the configured grant type1 resources for small data transmission in UL for INACTIVE state [RAN2]
No new RRC state should be introduced in this WID. Transmission of small data in UL, subsequent transmission of small data in UL and DL and the state transition decisions should be under network control.
Focus of the WID should be on licensed carriers and the solutions can be reused for NR-U if applicable.
Note 2: Any associated specification work in RAN1 that is needed to support the above set of objectives should be initiated by RAN2 via an LS.

A UE transmits data in RRC_CONNECTED state, and could transit to RRC_INACTIVE state to save the power when there is no data transmission. Upon data arrival while the UE is in RRC_INACTIVE state, the UE could resume the RRC connection and transit from RRC_INACTIVE state to RRC_CONNECTED state. However, RRC connection setup and subsequently release to RRC_INACTIVE state for each small and infrequent data lead to power consumption and signalling overhead. Therefore, small data transmission in RRC_INACTIVE state without connection establishment should be studied (as discussed in 3GPP RP-193252).

To enable Uplink (UL) transmission in RRC_INACTIVE state, RACH-based method and/or pre-configured PUSCH resources based method could be considered. The RACH-based method may include 2-step RA and/or 4-step RA. When some UL data is available for transmission (e.g. small data) while the UE is in RRC_INACTIVE state, the UE may initiate a RRC Resume procedure in RRC_INACTIVE state which triggers a Random Access (RA) procedure for the small data transmission.

For a 2-step RA (e.g. with small data), the UE sends a Message A (MSGA) including a RA preamble and a Physical Uplink Shared Channel (PUSCH) payload. The PUSCH payload may contain RRC resume request and the small data. In response to receiving the MSGA by the Network (NW), NW may send a Message B (MSGB) to inform the UE to complete the RA procedure and may transmit a RRC release message to keep the UE in the RRC_INACTIVE state. If the MSGB sent from the NW does not inform the UE to complete the RA procedure, but to fall back to the 4-step RA, the UE may use the UL grant in the MSGB to transmit a Msg3. The Msg3 may contain RRC resume request and the small data. In response to receiving the Msg3 by the NW, NW may send a Msg4 to inform the UE to complete RA procedure and may transmit a RRC release message to keep the UE in the RRC_INACTIVE state.

For a 4-step RA (e.g. with small data), the UE sends a RA preamble and waits for a RA response from the NW. In response to receiving the RA response from the NW, the UE may use the UL grant in the RA response to transmit a Msg3 which may contain RRC resume request and the small data. In response to receiving the Msg3 by the NW, NW may send a Msg4 to inform the UE to complete RA procedure and transmit a RRC release message to keep the UE in the RRC_INACTIVE state.

For the RACH-based method (e.g. 2-step RA, 4-step RA), an objective is to enable flexible payload sizes which are larger than the Rel-16 Common Control Channel (CCCH) message size to support small data transmission. It can be expected that the data sizes of MSGA in 2-step RA (or MSG3 in 4-step RA) would be larger than the case without small data transmission. It may also be expected that the MSGA transmission (or Msg3 transmission) containing small data would be more difficult to be successfully delivered under the same radio condition compared to the MSGA transmission (or Msg3 transmission) without containing small data. Since the radio condition may change from time to time, upon data arrival, it may not be always suitable for the UE to initiate a small data transmission in RRC_INACTIVE state compared to initiate a connection resume procedure (without small data transmission).

To solve the issue, a UE could consider radio condition as a factor to determine whether to initiate a RACH-based small data transmission. The UE may determine whether the RACH-based small data transmission is allowed to be initiated based on factors including radio condition. For example, the UE may use a threshold (of radio condition) to determine whether the radio condition is good enough to initiate a small data transmission. The UE may measure and/or derive the current radio condition and compare it with the threshold. If the radio condition is above the threshold, the UE initiates a small data transmission. If the radio condition is below the threshold, the UE may not initiate a small data transmission. If the radio condition is below the threshold, the UE may initiate a RACH transmission without small data. If the radio condition is below the threshold, the UE may wait for a period of time, e.g. wait for the radio condition turning better. If the radio condition is below the threshold, the UE may cancel the small data transmission. If the radio condition is below the threshold, the UE may stop the RA procedure for small data transmission. If the radio condition is below the threshold, the UE may continue the small data transmission.

Other factors (e.g. upper layer request, NW support, UE support, TB size) may be considered as well. The small data transmission may be initiated if all the necessary factors (including the radio condition) are fulfilled. The factors may include upper layer request. The RACH-based small data transmission may not be allowed if no upper layer request is indicated. The UE may not initiate a RACH-based small data transmission if the upper layer does not request a RACH-based small data transmission. The factors may include NW support. The RACH-based small data transmission may not be allowed if no NW support is indicated. The UE may not initiate a RACH-based small data transmission if the NW does not support RACH-based small data transmission. The factors may include UE support. The RACH-based small data transmission may not be allowed if no UE support is indicated. The UE may not initiate a RACH-based small data transmission if the UE does not support RACH-based small data transmission. The factors may include TB size. The RACH-based small data transmission may not be allowed if TB size is not allowed. The UE may not initiate a RACH-based small data transmission if the TB size of small data is not less than or equal to a TB size for RACH-based small data transmission.

The radio condition may be measured and/or derived by the UE. The radio condition may be derived from one or more measured result(s) from the UE. The radio condition and/or the measurement result may be with respect to a pathloss reference, an average of a set of pathloss references, and/or a reference signal of a beam (e.g. SS/PBCH Block (SSB), Channel State Information Reference Signal (CSI-RS)). The radio condition and/or the measurement result(s) may be based on a cell group, a serving cell, a carrier, a Bandwidth Part (BWP), and/or a beam. The radio condition may be represented by Reference Signal Received Power (RSRP). The radio condition may be represented by Reference Signal Received Quality (RSRQ). The radio condition may be represented by Signal-to-Interference-Plus-Noise Ratio (SINR).

The RACH-based small data transmission may be a 2-step RA. The RACH-based small data transmission may be a 4-step RA. The RACH-based small data transmission may be applicable when the UE is in RRC_INACTIVE state. The RACH-based small data transmission may be contention based. The RACH-based small data transmission may be contention-free.

A threshold may be provided in the RACH configuration on each BWP to determine the RA types (e.g. 2-step RA, 4-step RA), which is configured by the RRC separately for Normal Uplink (NUL) and Supplemental Uplink (SUL), as discussed in 3GPP R2-1915889. The RACH-based small data transmission in RRC_INACTIVE state may be contention-based and/or contention free, based on the configuration by the NW and/or based on the radio condition.

A RACH-based small data transmission procedure may be initiated upon (or in response to) the upper layer indicating a RRC resume procedure for small data transmission, e.g. when UL data arrival and/or with periods. A RACH-based small data transmission procedure may be initiated if the NW and the UE both support small data transmission and/or the related configuration is configured on the UE. A RACH-based small data transmission procedure may be initiated if the uplink data size is less than or equal to a Transport Block (TB) size indicated in the related configuration, the system information, the dedicated RRC signaling and/or the Downlink Control Information (DCI). One or more conditions mentioned above may be applied jointly.

If the radio condition is below the threshold, it may imply that it is not suitable to initiate (or proceed with) the RACH-based small data transmission. The UE may initiate a RA procedure without small data, e.g. a resume procedure. The UE may wait for a period of time, e.g. what for better radio condition. The UE may stop the RA procedure for small data transmission. The UE may continue the RA procedure. Some examples are shown below.

In one example, the UE stops the RA procedure for small data transmission. The small data could be transmitted in the next initiation by the upper layer.

In one example, the UE cancels the small data transmission and initiates (or fall back to/proceed with) a RA procedure to resume. The MSGA or Msg3 of the RA procedure contains RRC resume request without the small data. The RA procedure may be a 2-step RA or a 4-step RA (e.g. as specified in 3GPP R2-1914798). The small data could be transmitted in RRC_CONNECTED state.

In one example, the UE waits a while and then backs to the threshold to determine small data transmission. If the radio condition is above the threshold, the UE may initiate a small data transmission. If the radio condition is below the threshold, the UE may continue waiting. If the UE tries too many times to check the threshold or spends too much time on waiting, the UE may stop the RA procedure for small data transmission. The small data could be transmitted in the next initiation by the upper layer.

In one example, the UE waits a while and then backs to the threshold to determine small data transmission. If the radio condition is above the threshold, the UE may initiate a small data transmission. If the radio condition is below the threshold, the UE may continue waiting. If the UE tries too many times to check the threshold or spends too much time on waiting, the UE may cancel the small data transmission. The UE may initiate (or fall back to/proceed with) a RA procedure to resume. The MSGA or Msg3 of the RA procedure may contain RRC resume request without the small data. The RA procedure may be a 2-step RA or a 4-step RA. The small data could be transmitted in RRC_CONNECTED state.

In one example, the UE waits a while and then backs to the threshold to determine small data transmission. If the radio condition is above the threshold, the UE may initiate a small data transmission. If the radio condition is below the threshold, the UE may continue waiting. If the UE tries too many times to check the threshold or spends too much time on waiting, the UE may continue the RA procedure to transmit the small data regardless the radio condition. If the transmission fails, the UE may back off and retransmit the MSGA (or Msg3) with the small data in the RA procedure.

Upon the initiation of a RA procedure for the small data transmission (or called RACH-based small data transmission), the UE may determine a carrier to use (e.g. NUL, SUL) and a RA type to use (e.g. 2-step, 4-step) based on the radio condition. A first threshold (of radio condition) may be used to determine the carrier to use. The first threshold to determine the carrier may be associated with the serving cell. The first threshold (e.g. rsrp-ThresholdSSB-SUL) may be included in RACH-ConfigCommon. The first threshold may be included in BWP-UplinkCommon, UplinkConfig of supplementaryUplink, and/or ServingCellConfig. The UE may select SUL carrier to perform random access based on this threshold (as discussed in 3GPP TS 38.331).

A second threshold (of radio condition) may be used to determine the RA type to use. The second threshold to determine the RA type may be associated with the selected carrier. The UE may determine whether to transmit the small data based on radio condition. The second threshold (e.g. rsrp-Threshold-msgA) may be included in a RACH configuration (e.g. RACH-ConfigCommonTwoStepRA) in BWP-UplinkCommon. The UE selects a 2-step random access type to perform random access based on this threshold.

A threshold may be used to determine whether to initiate a small data transmission. The threshold to determine the small data transmission may be associated with the selected carrier and/or the selected RA type.

Figure 5:
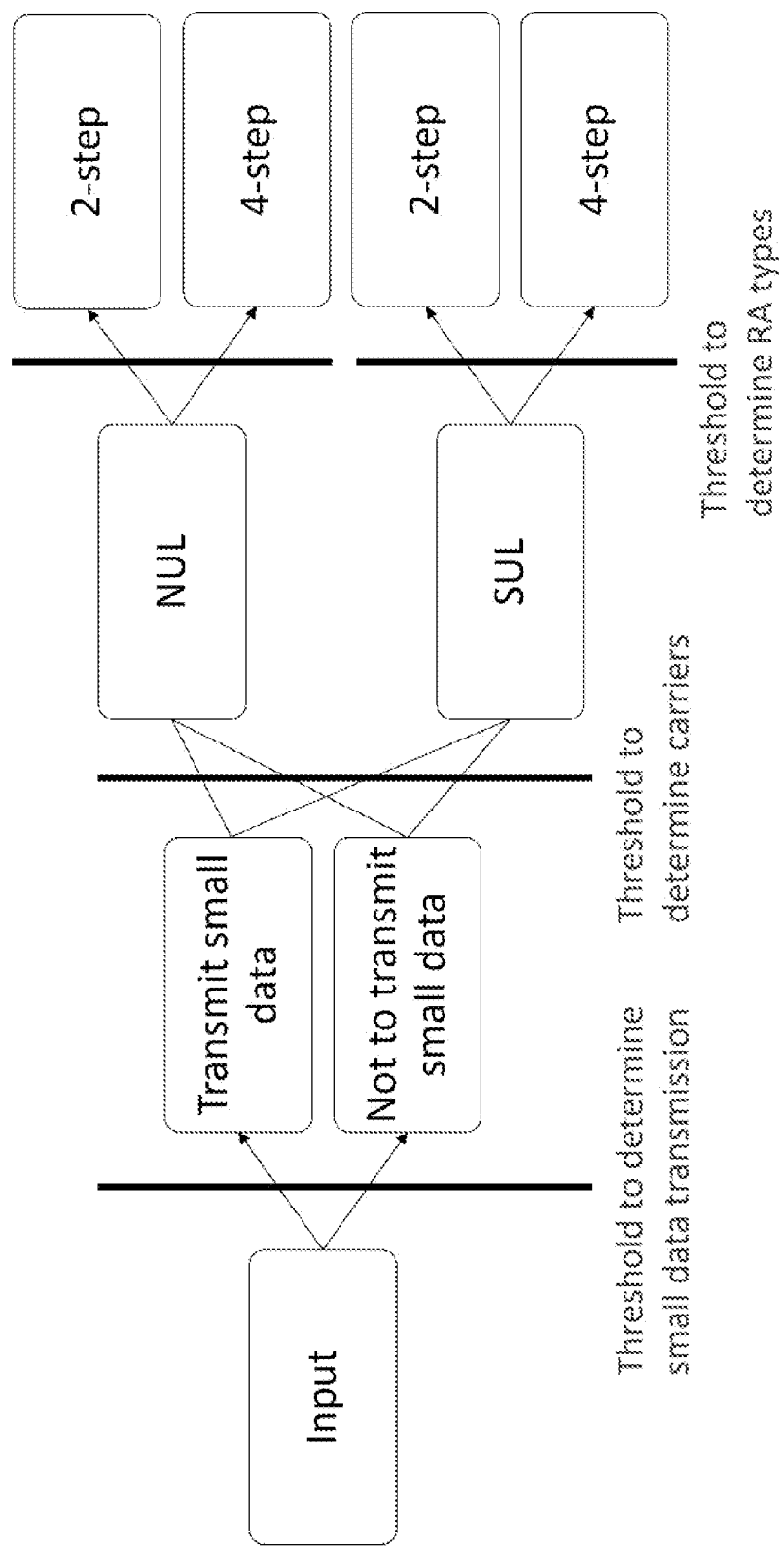
FIG. 5 illustrates a first example of Reference Signal Received Power (RSRP) threshold checking in Random (RA) initiation according to one exemplary embodiment.
Figure 6:
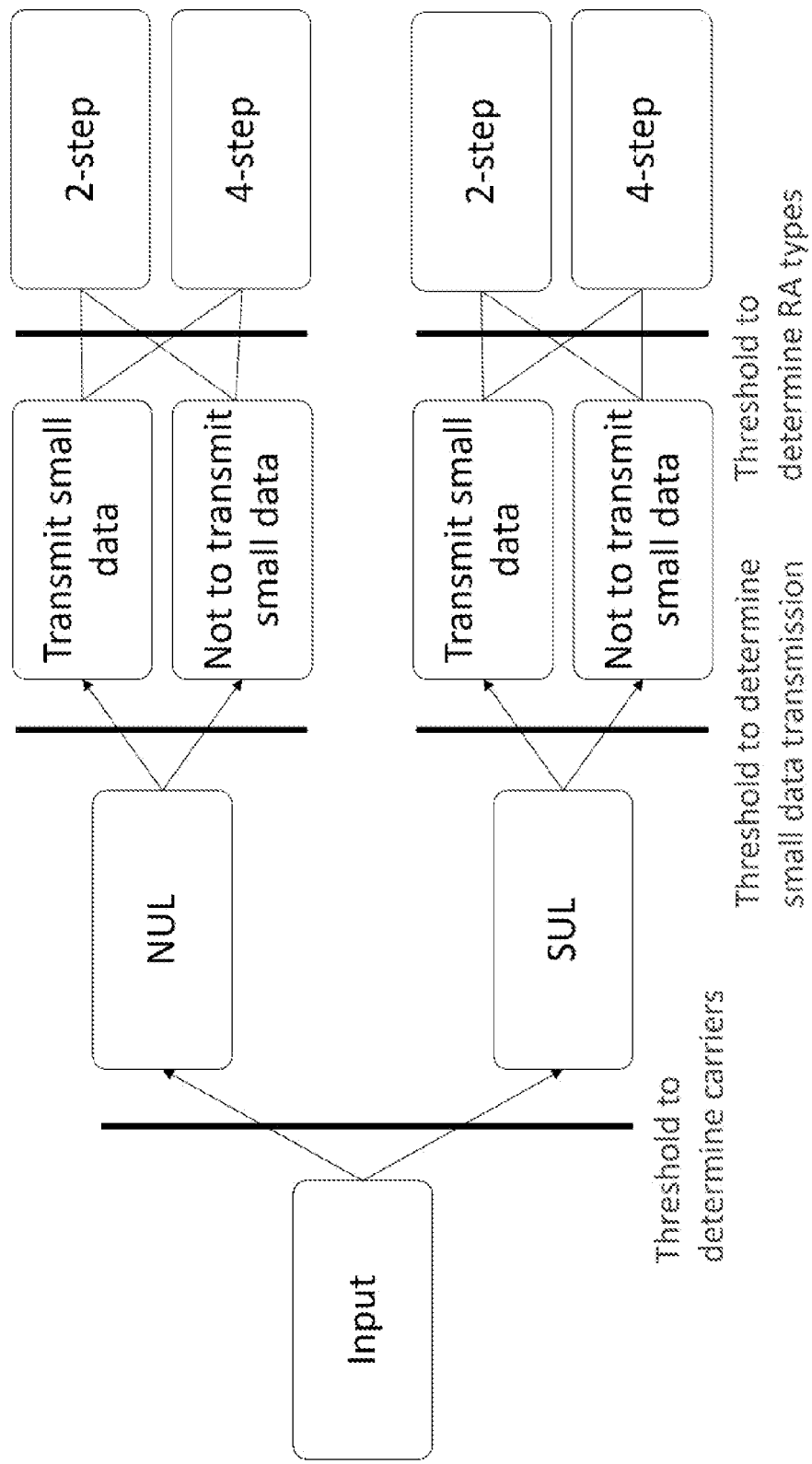
FIG. 6 illustrates a second example of RSRP threshold checking in RA initiation according to one exemplary embodiment.
Figure 7:
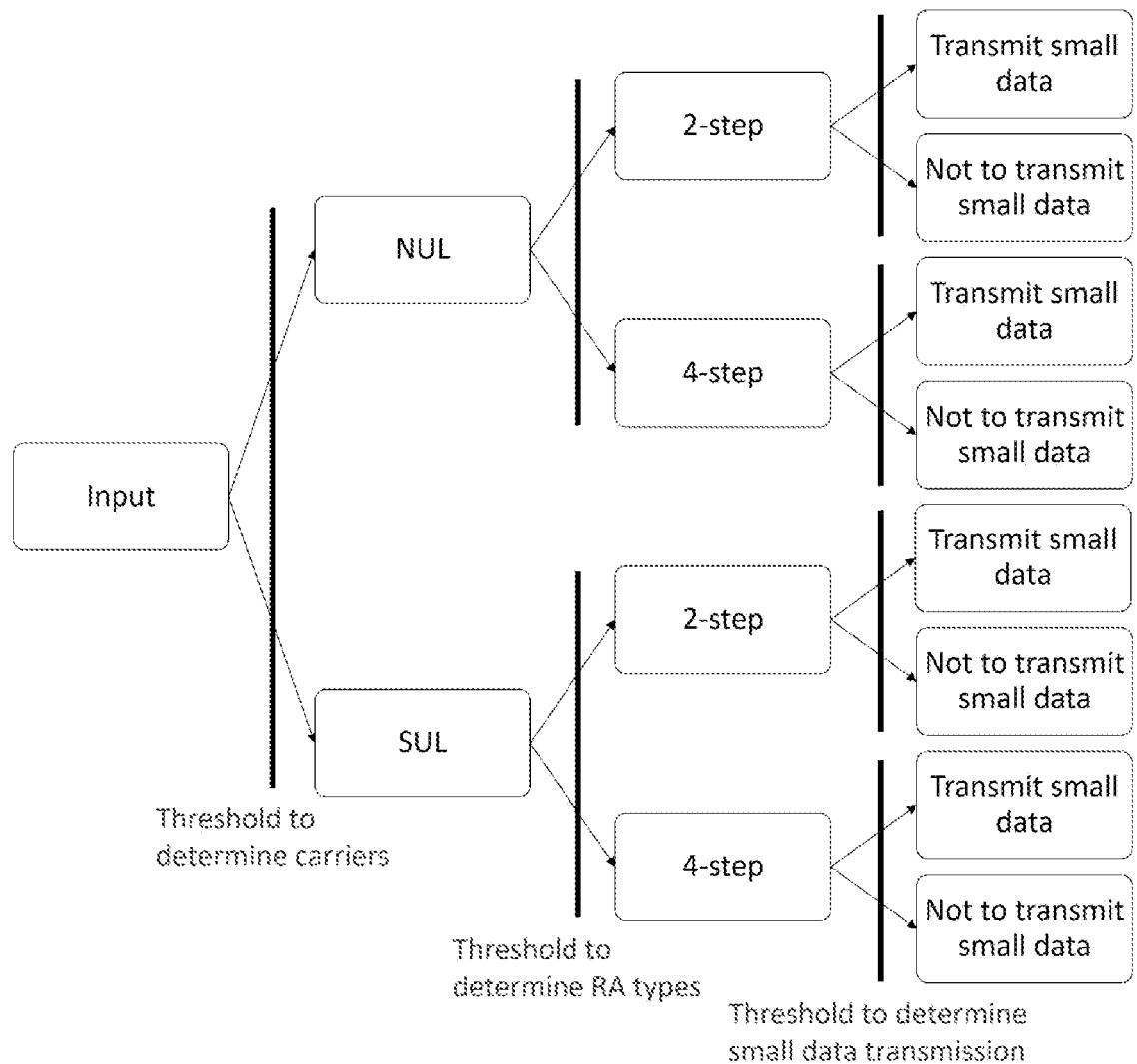
FIG. 7 illustrates a third example of RSRP threshold checking in RA initiation according to one exemplary embodiment.

In FIG. 5 to FIG. 7, the threshold to determine carriers is referred to the first threshold (e.g. rsrp-ThresholdSSB-SUL). In FIG. 5 to FIG. 7, the threshold to determine RA types may be referred to the second threshold (e.g. rsrp-Threshold-msgA). In FIG. 5 and FIG. 7, the threshold to determine small data transmission may be referred to the third threshold. The first, second, and/or third threshold may have the same or different values. Some examples are shown below.

Figure 8:
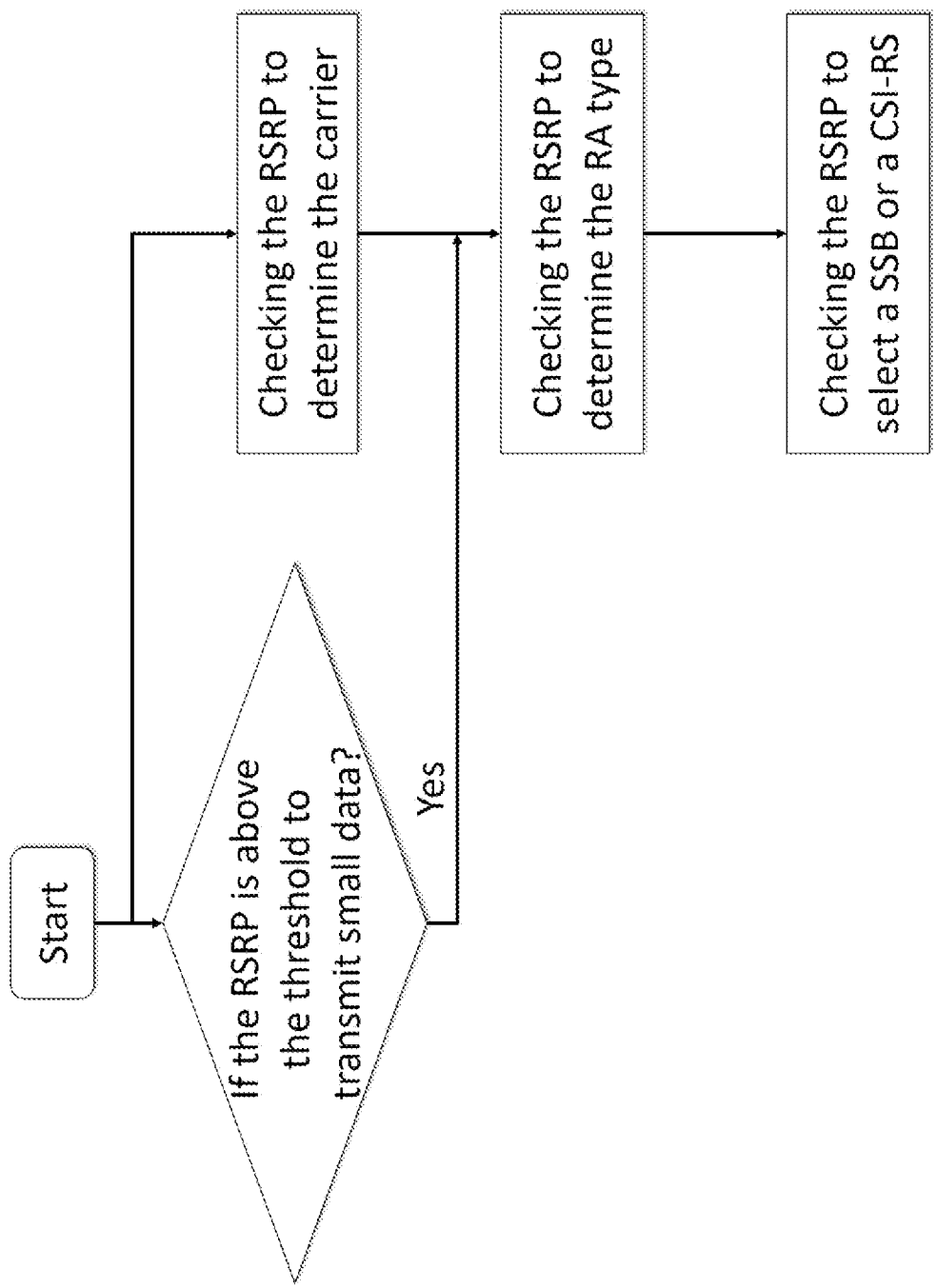
FIG. 8 illustrates a first example of determining whether to transmit small data in the RA procedure according to one exemplary embodiment.

In an example as shown in FIG. 5 and FIG. 8, the UE may determine whether to transmit small data and determine which carriers and RA types to use in the RA procedure by considering the radio condition. Upon RA initial, the UE may check whether the radio condition is above the third threshold to determine small data transmission and whether the RSRP of the DL pathloss reference is above the first threshold (e.g. rsrp-ThresholdSSB-SUL) (as specified in 3GPP TS 38.331) to determine which carriers (NUL or SUL) to use. According to the selected carrier, the UE may check whether the RSRP of the DL pathloss reference is above the second threshold (e.g. rsrp-Threshold-msgA) to determine which RA type (2-step or 4-step) to use. Then upon the UE entering the Random Access Resource selection procedure, the UE may check whether the SS-RSRP of any SSBs is above rsrp-ThresholdSSB (as specified in 3GPP TS 38.331) to select a SSB and/or the CSI-RSRP of any CSI-RSs is above rsrp-ThresholdCSI-RS (as specified in 3GPP TS 38.331) to select a CSI-RS to continue the remain RA procedure for small data transmission.

Figure 9:
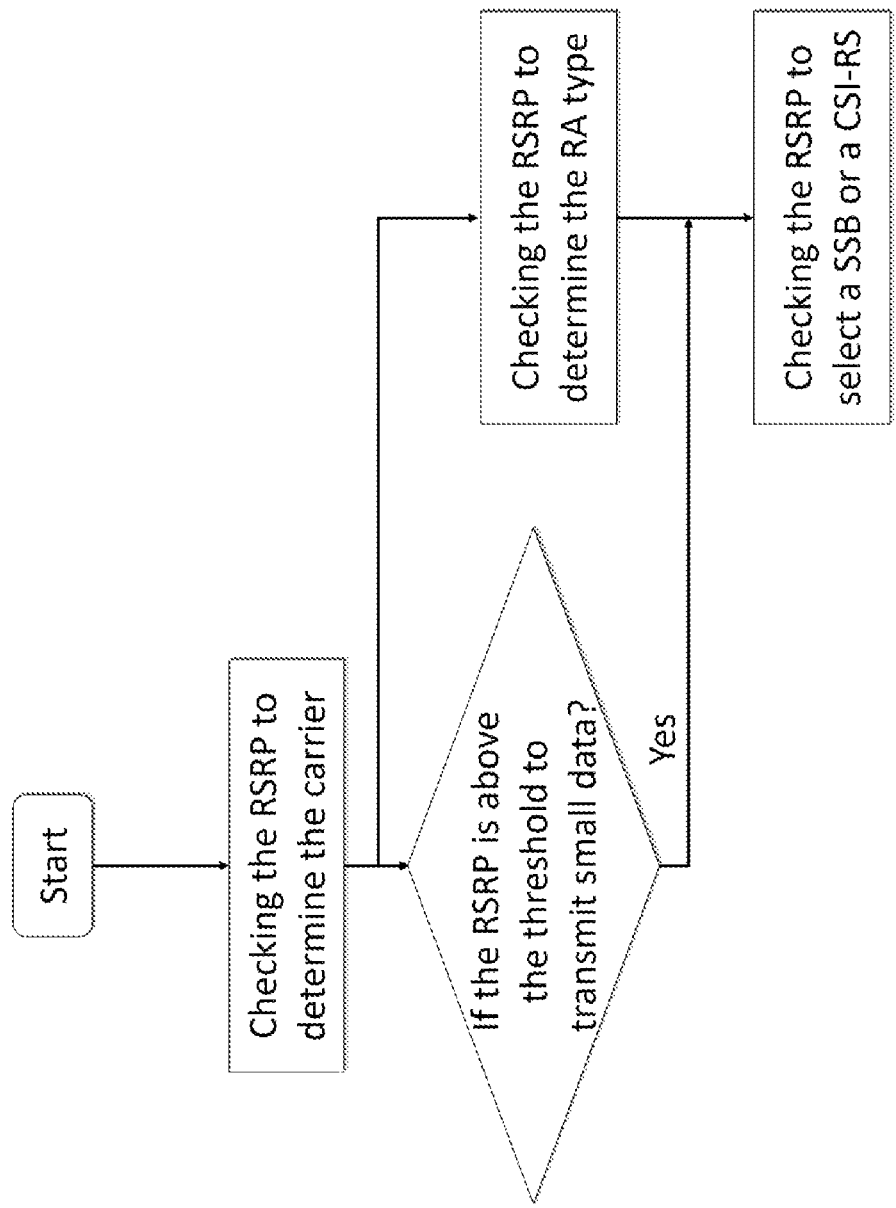
FIG. 9 illustrates a second example of determining whether to transmit small data in the RA procedure according to one exemplary embodiment.

In an example as shown in FIG. 6 and FIG. 9, the UE may determine which carriers to use, then determine whether to transmit small data and which RA types to use by considering the radio condition. Upon RA initial, the UE may check whether the RSRP of the DL pathloss reference is above the first threshold (e.g. rsrp-ThresholdSSB-SUL) to determine which carriers (NUL or SUL) to use. According to the selected carrier, the UE may check whether the radio condition is above the third threshold to determine small data transmission and whether the RSRP of the DL pathloss reference is above the second threshold (e.g. rsrp-Threshold-msgA) to determine which RA types (2-step or 4-step) to use. Then upon the UE entering the Random Access Resource selection procedure, the UE may check whether the SS-RSRP of any SSBs is above rsrp-ThresholdSSB to select a SSB and/or the CSI-RSRP of any CSI-RSs is above rsrp-ThresholdCSI-RS to select a CSI-RS to continue the remain RA procedure for small data transmission.

Figure 10:
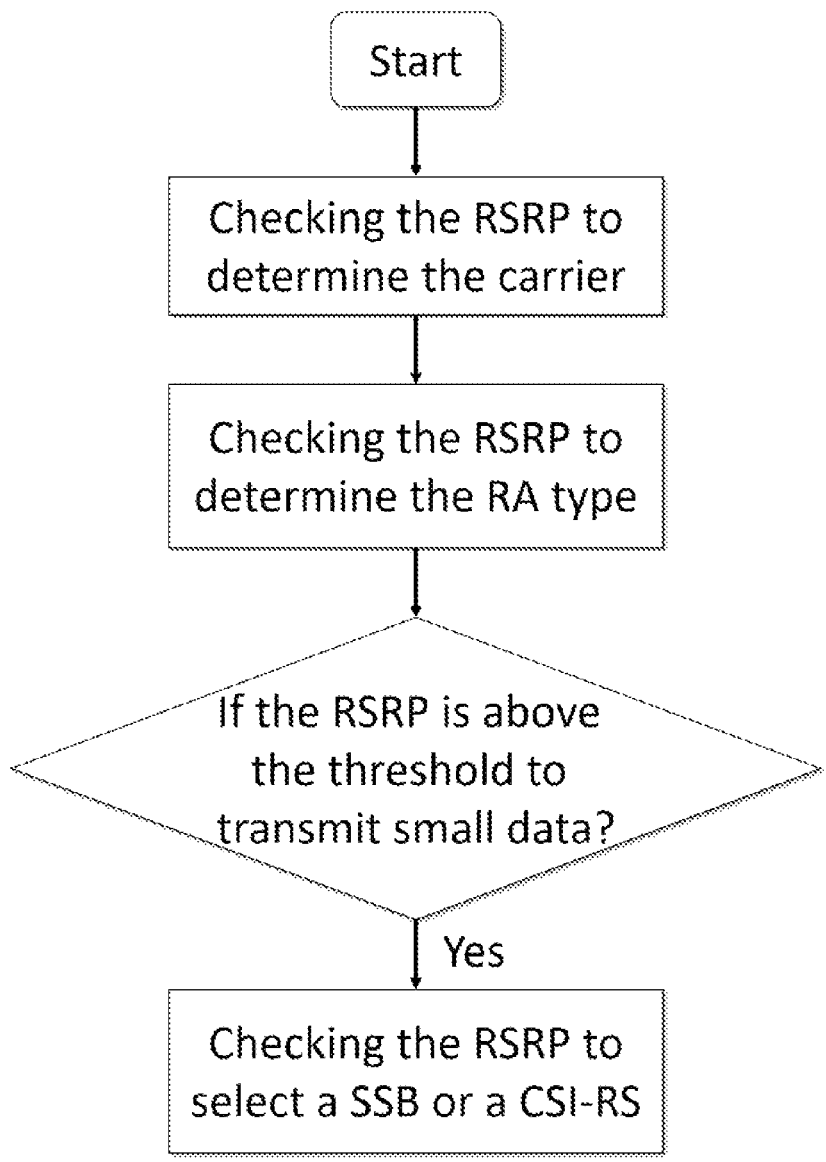
FIG. 10 illustrates a third example of determining whether to transmit small data in the RA procedure according to one exemplary embodiment.

In an example as shown in FIG. 7 and FIG. 10, the UE may determine which carriers to use, then determine which RA types to use, and then determine whether to transmit small data by considering the radio condition. Upon RA initial, the UE may check whether the RSRP of the DL pathloss reference is above the first threshold (e.g. rsrp-ThresholdSSB-SUL) to determine which carriers (NUL or SUL) to use. According to the selected carrier, the UE may check whether the RSRP of the DL pathloss reference is above the second threshold (e.g. rsrp-Threshold-msgA) to determine which RA types (2-step or 4-step) to use. Then according to the selected RA type, the UE may check whether the radio condition is above the third threshold to determine small data transmission. Upon the UE entering the Random Access Resource selection procedure, the UE may check whether the SS-RSRP of any SSBs is above rsrp-ThresholdSSB to select a SSB and/or the CSI-RSRP of any CSI-RSs is above rsrp-ThresholdCSI-RS to select a CSI-RS to continue the remain RA procedure for small data transmission.

Figure 11:
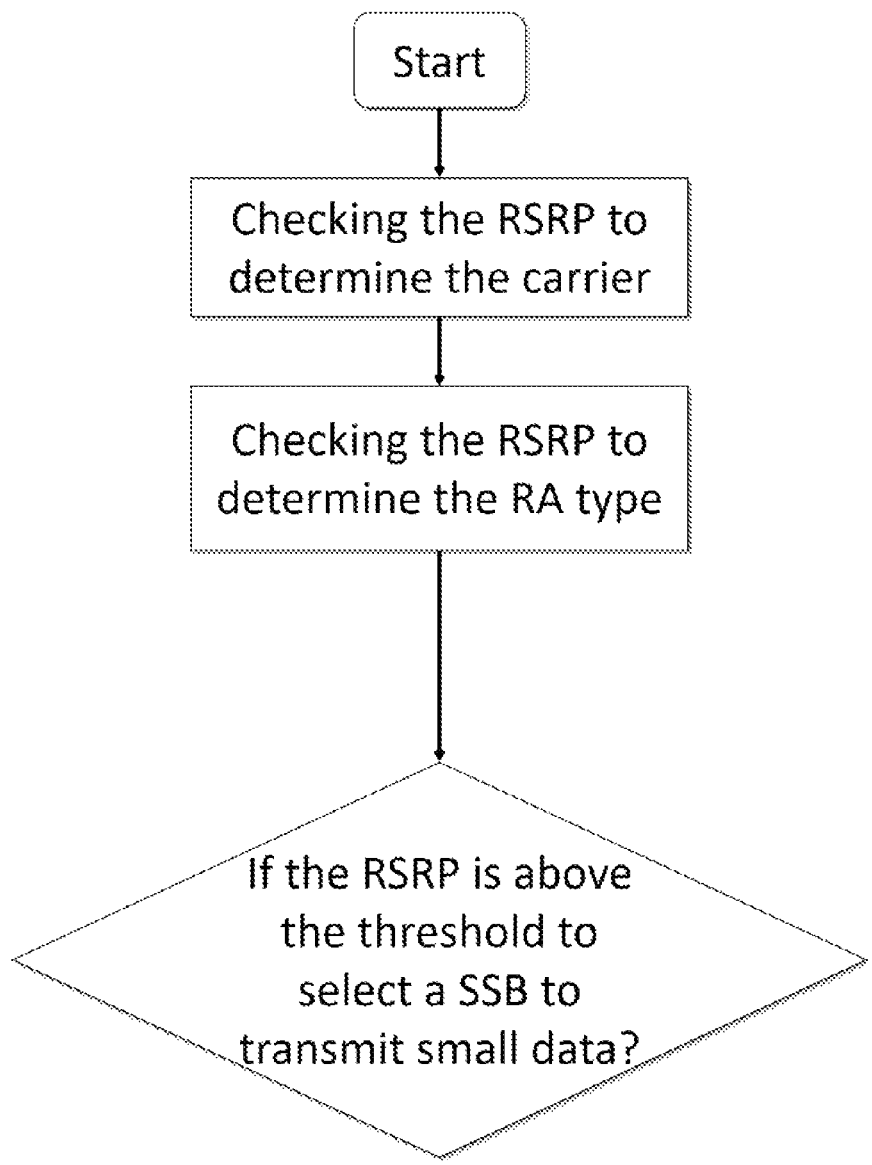
FIG. 11 illustrates a forth example of determining whether to transmit small data in the RA procedure according to one exemplary embodiment.

In an example as shown in FIG. 11, the UE may determine whether there are any suitable SSBs and/or CSI-RSs to transmit small data by considering the radio condition. Upon RA initial, the UE may check whether the RSRP of the DL pathloss reference is above the first threshold (e.g. rsrp-ThresholdSSB-SUL) to determine which carriers (NUL or SUL) to use. According to the selected carrier, the UE may check whether the RSRP of the DL pathloss reference is above the second threshold (e.g. rsrp-Threshold-msgA) to determine which RA types (2-step or 4-step) to use. Then upon the UE entering the Random Access Resource selection procedure, the UE may check whether the SS-RSRP of any available SSBs and/or CSI-RSRP of any available CSI-RSs is above the third threshold to determine small data transmission. The UE may use the selected SSB or CSI-RS to continue the remain RA procedure for small data transmission.

The UE may receive some configuration related to radio condition provided by the NW. For example, the configuration (namely, the related configuration) may include a threshold to determine the small data transmission. The configuration may be provided in system information, dedicated RRC signaling, and/or MAC CE. The configuration may be included in cell group configuration (e.g. CellGroupConfig), serving cell configuration (e.g. ServingCellConfig), uplink configuration (e.g. UplinkConfig), BWP configuration (e.g. BWP-Uplink, BWP-UplinkCommon, BWP-UplinkDedicated), and/or RACH configuration (e.g. RACH-ConfigCommon, RACH-ConfigCommonTwoStepRA, RACH-ConfigDedicated, RACH-ConfigGeneric). Some examples are shown below.

In an example as shown in FIG. 5 and FIG. 8, the configuration related to radio condition may be included in serving cell configuration (e.g. ServingCellConfig) and/or cell group configuration (e.g. CellGroupConfig).

In an example as shown in FIG. 6 and FIG. 9, the configuration related to radio condition may be included in BWP configuration (e.g. BWP-Uplink, BWP-UplinkCommon, BWP-UplinkDedicated) and/or uplink configuration (e.g. UplinkConfig), which is associated with the selected carrier (NUL or SUL).

In an example as showed in FIG. 7 and FIG. 10, the configuration related to radio condition may be included in RACH configuration (e.g. RACH-ConfigCommon, RACH-ConfigCommonTwoStepRA, RACH-ConfigDedicated, RACH-ConfigGeneric), which is associated with the selected carrier (NUL or SUL) and the selected RA type (2-step or 4-step).

In an example as showed in FIG. 11, the configuration related to radio condition may be included in RACH configuration (e.g. RACH-ConfigCommon, RACH-ConfigCommonTwoStepRA, RACH-ConfigDedicated, RACH-ConfigGeneric), cell group configuration (e.g. CellGroupConfig), serving cell configuration (e.g. ServingCellConfig), uplink configuration (e.g. UplinkConfig), and/or BWP configuration (e.g. BWP-Uplink, BWP-UplinkCommon, BWP-UplinkDedicated).

The UE may be referred to the UE or a MAC entity of the UE. The UE may be a NR device. The UE may be a $N_R$-light device (as discussed in 3GPP RP-193238). The UE may be a reduced capability device (as discussed in 3GPP RP-193238). The UE may be a mobile phone. The UE may be a wearable device. The UE may be a sensor. The UE may be a stationary device.

A RA procedure could be for small data transmission if the upper layer indicates a small data transmission. A RA procedure could be for small data transmission if the upper layer requests the resume of a suspended RRC connection for transmitting small data in RRC_INACTIVE state.

Figure 12:
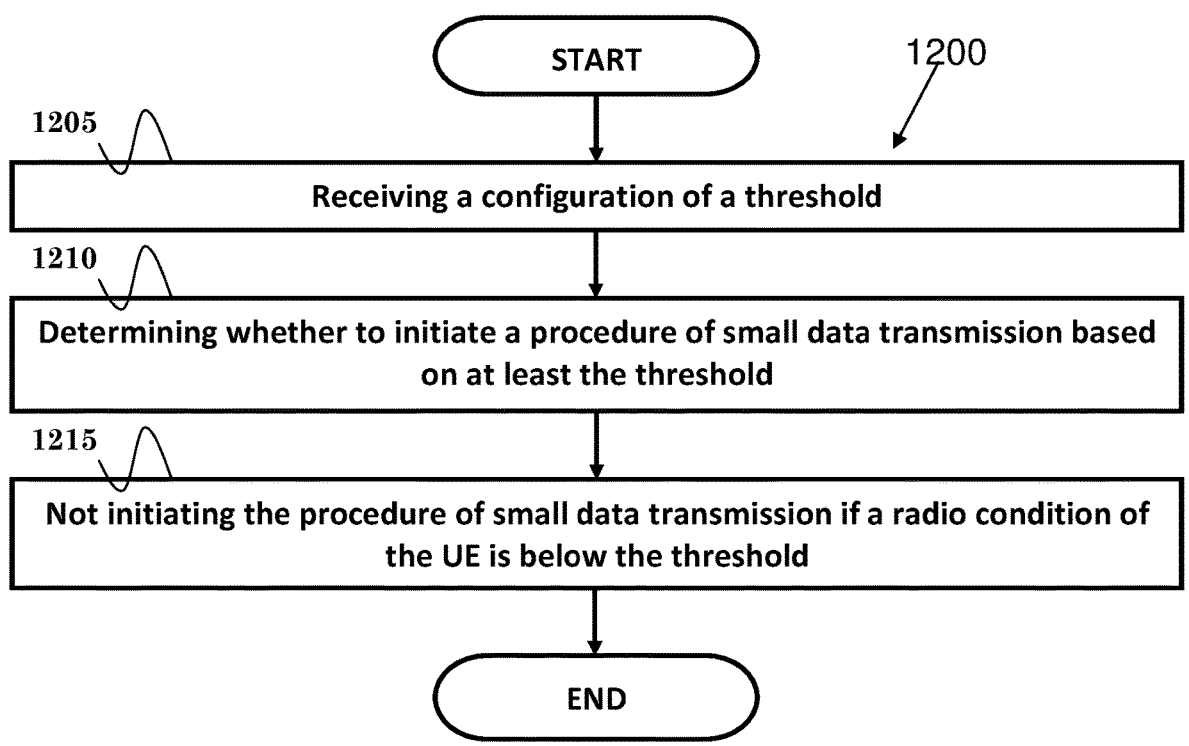
FIG. 12 is a flow chart according to one exemplary embodiment.

FIG. 12 is a flow chart 1200 according to one exemplary embodiment from the perspective of a UE. In step 1205, the UE receives a configuration of a threshold. In step 1210, the UE determines whether to initiate a procedure of small data transmission based on at least the threshold. In step 1215, the UE does not initiate the procedure of small data transmission if a radio condition of the UE is below the threshold.

In one embodiment, the UE may have UL data available for transmission when the UE is in RRC_INACTIVE state. The procedure of small data transmission may be used for transmitting the UL data in RRC_INACTIVE state. The procedure of small data transmission may be a RA procedure in RRC_INACTIVE state including the UL data. The UL data may be transmitted in MSGA or Msg3 of the RA procedure.

In one embodiment, the UE may initiate a RA procedure not including the UL data if the radio condition of the UE is below the threshold.

In one embodiment, the radio condition of the UE may be a RSRP of pathloss reference. The threshold may be a RSRP threshold.

In one embodiment, the configuration may be a configuration of small data transmission. The procedure of small data transmission may be triggered by an upper layer.

Referring back to FIGS. 3 and 4, in one exemplary embodiment of a UE. The UE 300 includes a program code 312 stored in the memory 310. The CPU 308 could execute program code 312 to enable the UE (i) to receive a configuration of a threshold, (ii) to determine whether to initiate a procedure of small data transmission based on at least the threshold, and (iii) to not initiate the procedure of small data transmission if a radio condition of the UE is below the threshold. Furthermore, the CPU 308 can execute the program code 312 to perform all of the above-described actions and steps or others described herein.

Figure 13:
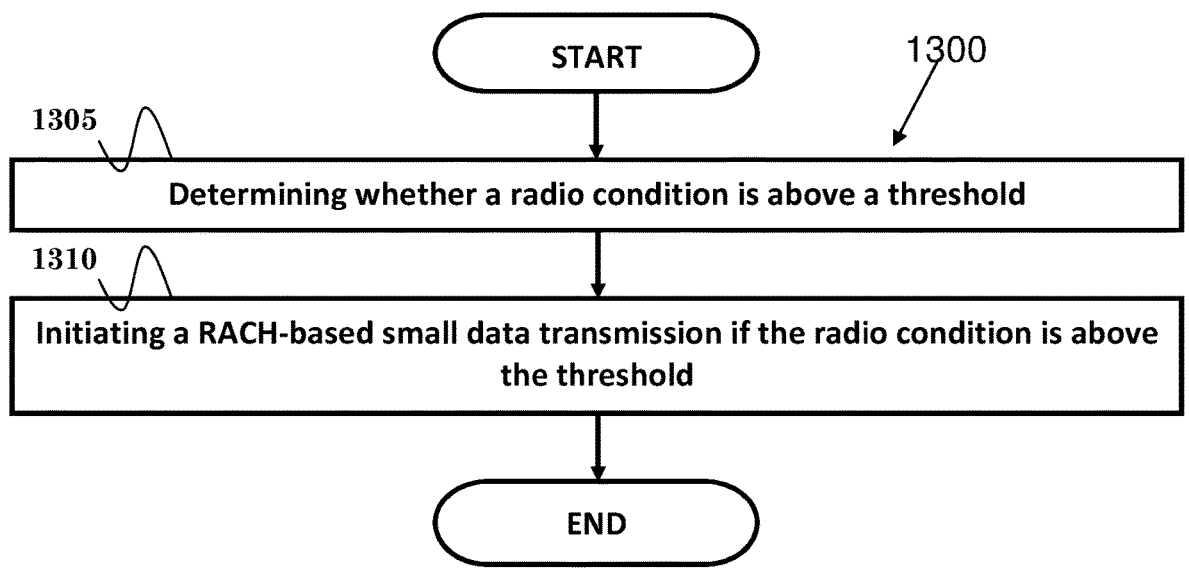
FIG. 13 is a flow chart according to one exemplary embodiment.

FIG. 13 is a flow chart 1300 according to one exemplary embodiment from the perspective of a UE, wherein there is UL data available for transmission while the UE is in RRC_INACTIVE state. In step 1305, the UE determines whether a radio condition is above a threshold. In step 1310, the UE initiates a RACH-based small data transmission if the radio condition is above the threshold.

In one embodiment, the RACH-based small data transmission procedure may be a 2-step and/or a 4-step RA. The RACH-based small data transmission procedure may be contention-based and/or contention free RA. In one embodiment, (all or at least part of) the UL data may be transmitted in MSGA and/or Msg3.

In one embodiment, the RACH-based small data transmission procedure may be initiated upon the upper layer indicates a RRC resume procedure for small data transmission. The RACH-based small data transmission procedure may be initiated upon the upper layer requests the resume of a suspended RRC connection for transmitting small data in RRC_INACTIVE state. Furthermore, the RACH-based small data transmission procedure may be initiated if the UE supports small data transmission. In addition, the RACH-based small data transmission procedure may be initiated if a related configuration is configured on the UE. The RACH-based small data transmission procedure may be initiated if the uplink data size is less than or equal to a TB size indicated in the related configuration, the system information, the dedicated RRC signaling and/or the DCI.

In one embodiment, the radio condition may be with respect to a pathloss reference, an average of a set of pathloss references, and/or a reference signal of a beam (e.g. SSBs and/or CSI-RSs). The radio condition may be based on a cell group, a serving cell, a carrier, a BWP, and/or a beam. The radio condition may be represented by RSRP, Reference Signal Received Quality (RSRQ), and/or SINR.

In one embodiment, the UE could determine whether the radio condition is strong enough to transmit the small data upon a RA procedure is initiated and/or upon entering the RA Resources selection.

In one embodiment, the UE could measure and/or derive the current radio condition and comparing it with a first threshold to determine which carriers to use. Furthermore, the UE could measure and/or derive the current radio condition and comparing it with a second threshold to determine which RA type to use. In addition, the UE could measure and/or derive the current radio condition and comparing it with a third threshold to determine whether to transmit small data.

In one embodiment, the third threshold may be associated with cell group, serving cell, carrier, RA types, and/or other RA resources. If the radio condition is above the third threshold, the UE could initiate a small data transmission. If the radio condition is below the third threshold, the UE could wait for a period of time, stop the RA procedure for small data transmission, cancel the small data transmission, and/or continue the small data transmission. If waiting time of the UE or number of accesses of the UE exceeds a value or a fourth threshold (ex: the UE spends too much time or too many tries on waiting), the UE could stop the RA procedure for small data transmission, cancel the small data transmission, and/or continue the small data transmission. If the UE cancels small data transmission, the UE could resume to RRC_CONNECTED state.

In one embodiment, the UE could receive the related configuration related to small data transmission (e.g. radio condition threshold) provided by the NW. The related configuration may be provided in system information, dedicated RRC signaling, and/or MAC CE. The related configuration is included in cell group configuration (e.g. CellGroupConfig), serving cell configuration (e.g. ServingCellConfig), uplink configuration (e.g. UplinkConfig), BWP configuration (e.g. BWP-Uplink, BWP-UplinkCommon, BWP-UplinkDedicated), and/or RACH configuration (e.g. RACH-ConfigCommon, RACH-ConfigCommonTwoStepRA, RACH-ConfigDedicated, RACH-ConfigGeneric).

In one embodiment, the UE may be a NR device, a NR-light device, a reduced capability device, a mobile phone, a wearable device, a sensor, or a stationary device. The UE could be with mobility capability or with no mobility capability.

Referring back to FIGS. 3 and 4, in one exemplary embodiment of a UE, wherein there is UL data available for transmission while the UE is in RRC_INACTIVE state. The UE 300 includes a program code 312 stored in the memory 310. The CPU 308 could execute program code 312 to enable the UE (i) to determine whether a radio condition is above a threshold, and (iii) to initiate a RACH-based small data transmission if the radio condition is above the threshold. Furthermore, the CPU 308 can execute the program code 312 to perform all of the above-described actions and steps or others described herein.

Figure 14:
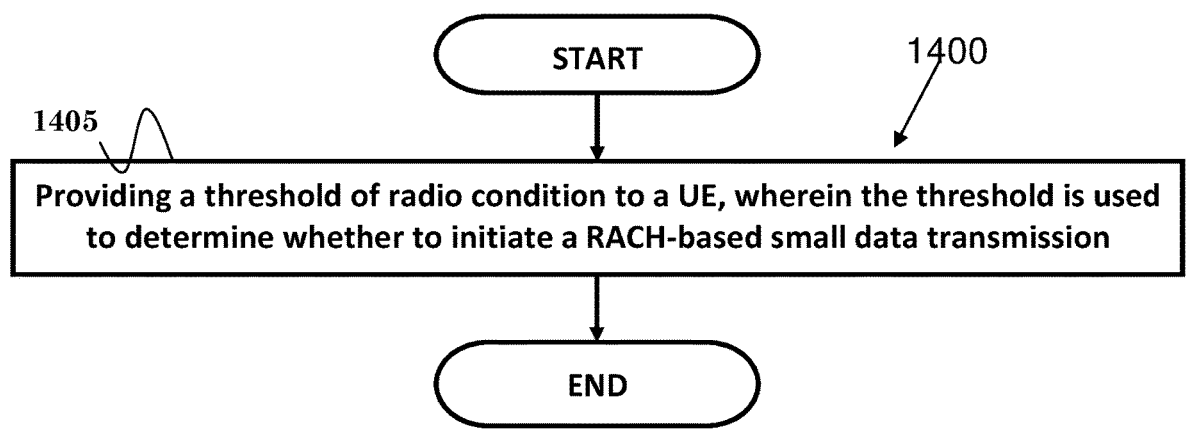
FIG. 14 is a flow chart according to one exemplary embodiment.

FIG. 14 is a flow chart 1400 according to one exemplary embodiment from the perspective of a NW. In step 1405, the NW provides a threshold of radio condition to a UE, wherein the threshold is used to determine whether to initiate a RACH-based small data transmission.

In one embodiment may be included in a related configuration (e.g., RACH configuration, including but not limited herein). The RACH-based small data transmission procedure may be a 2-step and/or a 4-step RA. The RACH-based small data transmission procedure may be contention-based and/or contention free RA. The RACH-based small data may be received in MSGA or Msg3.

In one embodiment, the RACH-based small data transmission procedure may be initiated if the NW supports small data transmission. Furthermore, the RACH-based small data transmission procedure may be initiated if the related configuration is provided to the UE.

In one embodiment, the NW could receive a MSGA and/or a Msg3 with small data from the UE. The NW could transmit a MSGB and/or a Msg4 to inform the UE to complete the RACH-based small data transmission. The NW could transmit a RRC release message to keep the UE in the RRC_INACTIVE state.

Referring back to FIGS. 3 and 4, in one exemplary embodiment of a network. The network 300 includes a program code 312 stored in the memory 310. The CPU 308 could execute program code 312 to enable the network to provide a threshold of radio condition to a UE, wherein the threshold is used to determine whether to initiate a RACH-based small data transmission. Furthermore, the CPU 308 can execute the program code 312 to perform all of the above-described actions and steps or others described herein.

Various aspects of the disclosure have been described above. It should be apparent that the teachings herein could be embodied in a wide variety of forms and that any specific structure, function, or both being disclosed herein is merely representative. Based on the teachings herein one skilled in the art should appreciate that an aspect disclosed herein could be implemented independently of any other aspects and that two or more of these aspects could be combined in various ways. For example, an apparatus could be implemented or a method could be practiced using any number of the aspects set forth herein. In addition, such an apparatus could be implemented or such a method could be practiced using other structure, functionality, or structure and functionality in addition to or other than one or more of the aspects set forth herein. As an example of some of the above concepts, in some aspects concurrent channels could be established based on pulse repetition frequencies. In some aspects concurrent channels could be established based on pulse position or offsets. In some aspects concurrent channels could be established based on time hopping sequences. In some aspects concurrent channels could be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the

The invention claimed is:

1. A method for a User Equipment (UE), comprising:
   receiving a configuration of a first Reference Signal Received Power (RSRP) threshold, a configuration of a second RSRP threshold, and a configuration of a third RSRP threshold, wherein the configuration of the third RSRP threshold is a configuration of small data transmission;
   initiating a Radio Resource Control (RRC) resume procedure in RRC INACTIVE for the small data transmission;
   using multiple RSRP thresholds including the first RSRP threshold, the second RSRP threshold, and the third RSRP threshold, for the small data transmission, wherein:
      the first RSRP threshold is used to determine carrier for a Random Access Channel (RACH)-based small data transmission, the second RSRP threshold is used to determine Random Access (RA) type for the RACH-based small data transmission, and
      the third RSRP threshold is used to determine whether to initiate small data transmission, which is either RACH-based or pre-configured Physical Uplink Shared Channel (PUSCH) resource-based;
   determining whether to initiate the small data transmission based on the third RSRP threshold, wherein the UE determines to initiate the small data transmission if at least a radio condition of the UE is above the third RSRP threshold;
   determining a carrier for the RACH-based small data transmission based on the first RSRP threshold after determining to initiate the small data transmission based on the third RSRP threshold; and
   determining an RA type for the RACH-based small data transmission based on the second RSRP threshold after determining the carrier for the RACH-based small data transmission based on the first RSRP threshold.

2. The method of claim 1, wherein the UE determines to not initiate the small data transmission if a radio condition of the UE is below the third RSRP threshold.

3. The method of claim 1, wherein the configuration of the third RSRP threshold is received in system information.

4. The method of claim 1, wherein the configuration of the first RSRP threshold is received in RACH-ConfigCommon.

5. The method of claim 1, wherein the configuration of the second RSRP threshold is received in a RACH configuration.

6. The method of claim 1, wherein the small data transmission is triggered by an upper layer.

7. The method of claim 1, wherein the small data transmission is used for transmitting uplink data in RRC_INACTIVE state.

8. The method of claim 1, wherein the UE triggers an RA procedure for the small data transmission.

9. A User Equipment (UE), comprising:
   a processor; and
   a memory operatively coupled to the processor, wherein the processor is configured to execute a program code to:
      receive a configuration of a first Reference Signal Received Power (RSRP) threshold, a configuration of a second RSRP threshold, and a configuration of a third RSRP threshold, wherein the configuration of the third RSRP threshold is a configuration of small data transmission;
      initiate a Radio Resource Control (RRC) resume procedure in RRC INACTIVE for a small data transmission;
      use multiple RSRP thresholds including the first RSRP threshold, the second RSRP threshold, and the third RSRP threshold, for the small data transmission, wherein:
         the first RSRP threshold is used to determine carrier for a Random Access Channel (RACH)-based small data transmission, the second RSRP threshold is used to determine Random Access (RA) type for the RACH-based small data transmission, and
         the third RSRP threshold is used to determine whether to initiate small data transmission, which is either RACH-based or pre-configured Physical Uplink Shared Channel (PUSCH) resource-based;
      determine whether to initiate the small data transmission based on the third RSRP threshold, wherein the UE determines to initiate the small data transmission if at least a radio condition of the UE is above the third RSRP threshold;
      determine a carrier for the RACH-based small data transmission based on the first RSRP threshold after determining to initiate the small data transmission based on the third RSRP threshold; and
      determine an RA type for the RACH-based small data transmission based on the second RSRP threshold after determining the carrier for the RACH-based small data transmission based on the first RSRP threshold.

10. The UE of claim 9, wherein the UE determines to not initiate the small data transmission if a radio condition of the UE is below the third RSRP threshold.

11. The UE of claim 9, wherein the configuration of the third RSRP threshold is received in system information.

12. The UE of claim 9, wherein the configuration of the first RSRP threshold is received in RACH-ConfigCommon.

13. The UE of claim 9, wherein the configuration of the second RSRP threshold is received in a RACH configuration.

14. The UE of claim 9, wherein the small data transmission is triggered by an upper layer.

15. The UE of claim 9, wherein the small data transmission is used for transmitting uplink data in RRC_INACTIVE state.

16. The UE of claim 9, wherein the UE triggers an RA procedure for the small data transmission.

* * * * *